US00RE41165E

(19) United States
(12) Reissued Patent
Hoddie et al.

(10) Patent Number: US RE41,165 E
(45) Date of Reissued Patent: Mar. 16, 2010

(54) METHOD AND APPARATUS FOR IDENTIFYING USER-SELECTABLE REGIONS WITHIN MULTIPLE DISPLAY FRAMES

(75) Inventors: J. Peter Hoddie, Menlo Park, CA (US); Sean D. Allen, Santa Clara, CA (US)

(73) Assignee: Apple Inc., Cupertino, CA (US)

(21) Appl. No.: 10/116,725

(22) Filed: Apr. 3, 2002

Related U.S. Patent Documents

Reissue of:
(64) Patent No.: 6,137,484
Issued: Oct. 24, 2000
Appl. No.: 08/940,704
Filed: Sep. 30, 1997

U.S. Applications:
(63) Continuation of application No. 08/437,089, filed on May 5, 1995, now Pat. No. 5,727,141.

(51) Int. Cl.
*G06F 17/00* (2006.01)

(52) U.S. Cl. ..... 715/201; 715/202; 715/203; 715/204

(58) Field of Classification Search ..... 715/201–204, 715/500.1; 348/538; 382/300; 725/105, 115
See application file for complete search history.

(56) References Cited

U.S. PATENT DOCUMENTS

| | | | | | |
|---|---|---|---|---|---|
| 4,601,003 | A | | 7/1986 | Yoneyama et al. | |
| 4,941,111 | A | | 7/1990 | Sfarti | |
| 4,956,801 | A | | 9/1990 | Priem et al. | |
| 4,977,518 | A | | 12/1990 | Bonnet et al. | |
| 5,021,770 | A | | 6/1991 | Aisaka et al. | |
| 5,107,252 | A | | 4/1992 | Traynar et al. | |
| 5,109,482 | A | | 4/1992 | Bohrman | |
| 5,155,806 | A | | 10/1992 | Hoeber et al. | |
| 5,174,759 | A | | 12/1992 | Preston et al. | |
| 5,214,504 | A | * | 5/1993 | Toriu et al. | 375/240.02 |
| 5,237,648 | A | | 8/1993 | Mills et al. | |
| 5,270,694 | A | | 12/1993 | Naimark et al. | |
| 5,274,753 | A | | 12/1993 | Roskowski et al. | |
| 5,307,457 | A | | 4/1994 | Beitel et al. | |
| 5,317,680 | A | | 5/1994 | Ditter, Jr. | |
| 5,319,382 | A | | 6/1994 | Fitzpatrick et al. | |
| 5,359,712 | A | | 10/1994 | Cohen et al. | |
| 5,388,197 | A | | 2/1995 | Rayner | |
| 5,414,811 | A | * | 5/1995 | Parulski et al. | 345/501 |
| 5,422,674 | A | * | 6/1995 | Hooper et al. | 375/240.15 |
| 5,528,263 | A | * | 6/1996 | Platzker et al. | 345/156 |
| 5,606,655 | A | * | 2/1997 | Arman et al. | 345/440 |
| 5,727,141 | A | * | 3/1998 | Hoddie et al. | 345/475 |
| 5,754,851 | A | * | 5/1998 | Wissner | 707/104.1 |
| 6,219,048 | B1 | | 4/2001 | Miller et al. | |

OTHER PUBLICATIONS

Foley, James, et al., "Computer Graphics: Principles and Practice," Addison–Wesley Publishing Co., 1064–64, 1990.

(Continued)

*Primary Examiner*—Rachna Singh
(74) *Attorney, Agent, or Firm*—Fenwick & West LLP

(57) ABSTRACT

The method and apparatus determine a specific position of a user-selectable region at a particular point in time within a sequence of display frames. The method and apparatus first interpolate between a first matrix representing the user-selectable region at a first point in time and a second matrix representing the user-selectable region at a second point in time. In one embodiment, the matrix generated by this interpolation is then applied to a region definition for the user-selectable region to determine the specific area occupied by the region at the particular point in time. According to one embodiment, the first matrix and the second matrix are both stored within the same sample of a container track. This sample corresponds to one or more frames of the sequence of display frames. In an alternate embodiment, the first matrix and the second matrix are stored in two separate samples of the container track.

129 Claims, 7 Drawing Sheets

OTHER PUBLICATIONS

Minors, Ota, et al., "CDI Disk for Karaoke," Patent Abstracts of Japan for JP3116474, May 17, 1991, 1 page.

Tonomura, Yoshinobu, et al., "Content Oriented Visual Interface Using Video Icons for Visual Database Systems," 1989 IEEE, Apr. 1989, pp. 68–73.

Hanrahan, Pat, et al., "Direct WYSIWYG Painting and Texturing on 3D Shapes," Computer Graphics, vol. 24, No. 4, Aug. 1990, pp. 215–223.

Foley, James D., et al., "Fundamentals of Interactive Computer Graphics," Addison–Wesley Publishing Company, 1982, pp. 200–204.

Weghorst, Hank, et al., "Improved Computational Methods for Ray Tracing," ACM Transaction on Graphics, vol. 3, No. 1, Jan. 1984, pp. 52–69.

Russ, John C., "Quicktime as a Basis for Time Sequence Imaging," Journal of Computer–Assisted Microscopy, vol. 7, No. 2, 1995, pp. 113–125.

Cohen, Michael F., et al., "The Hemi–Cube: A Radiosity Solution for Complex Environments," San Francisco, Jul. 22–26, vol. 19, No. 3, 1985, pp. 31–40.

* cited by examiner

METHOD AND APPARATUS FOR IDENTIFYING USER-SELECTABLE REGIONS WITHIN MULTIPLE DISPLAY FRAMES

Matter enclosed in heavy brackets [ ] appears in the original patent but forms no part of this reissue specification; matter printed in italics indicates the additions made by reissue.

This is a continuation application Ser. No. 08/437,089, filed May 5, 1995, now U.S. Pat. No. 5,727,141.

BACKGROUND OF THE INVENTION

1. Field of the Invention

The present invention pertains to the identification of user-selectable regions. More particularly, this invention relates to identifying user-selectable regions within a sequence of display frames.

2. Background

Computer technology is continually advancing, providing newer and newer systems, each more powerful than the previous. These high-performance computer systems are finding expanded uses in a wide range of personal, business and academic fields. One such use of high-performance computer technology is in the area of multimedia. Multi-media refers to providing information to system users via multiple mediums concurrently. For example, multimedia may include concurrent presentation of video, audio and textual information. In addition, many multimedia systems provide for user-interaction, which allows system users to interact with the information being presented to them.

One disadvantage to multimedia systems, however, is the large amount of data necessary to generate the presentation. For example, a typical multimedia movie displayed by a computer system is displayed at a rate of 30 frames per second (fps). Each frame within the movie can require up to 1.2 megabytes of storage space for a 640×480 resolution display device utilizing 32 bits of color. Thus, a 60-second movie requires 1800 frames, or up to 2.16 gigabytes of video data. In addition, storage space is also required for any audio, textual, etc. data being presented concurrently with the video data, as well as storage space for any other control information for the movie. Thus, it would be beneficial to provide a system which reduces the amount of data necessary to display a multimedia movie.

One type of user-interaction currently supported in many non-multimedia applications is referred to as a "hot spot" or "hot button". A hot button is a region identified on the display device as being selectable by the user. For example, a hot button may be a rectangular-shaped region on the screen with the word "help" in the middle. By moving a pointing device over the hot button with a mouse and depressing a mouse button, the help hot button is selected by the user. Upon receipt of this input, the computing system responds by displaying, for example, an index screen identifying subject headings for which help is available.

The control information required to support hot buttons in a multimedia movie requires additional storage space within the computer system. Typically, programs using hot buttons store the data for the hot button in the computer system for each display frame containing the button. However, due to the storage requirements of the video and other multimedia presentation data, it would be beneficial to provide a memory-efficient manner in which to store the necessary control information for hot buttons in multimedia movies.

Furthermore, user-interaction typically supports multiple user options concurrently. For example, both a "help" hot button and a "preferences" hot button may be displayed to the system user. The system's response is thus dependent on which hot button, if any, is activated by the system user. Thus, it would be beneficial to provide a system which could display multiple user-selectable regions in a multimedia movie concurrently and accurately distinguish between regions to determine which region is selected.

Additionally, it would be advantageous to allow a particular hot button to cause different responses by the computer system at different points in time. For example, the help index displayed to the user upon activating the help hot button may be different depending on when the user selects the hot button. The information to be displayed by the computer system may change any number of times during the presentation of the video information, up to and including multiple changes for each frame. Typically, these changes are supported in the system by storing a separate help hot button for each frame in which the button occurs. Storing such separate information, however, requires significant additional storage for the movie. Thus, it would be beneficial to provide an efficient manner in which to keep track of which of several actions should be taken by the system upon selection of a hot button.

The present invention provides for these and other advantageous results.

SUMMARY OF THE INVENTION

A method and apparatus for identifying user-selectable regions within multiple display frames is described herein. The apparatus identifies a user-selectable region by determining a specific position of the user-selectable region at a particular point in time within a sequence of display frames. The apparatus then interpolates between a first matrix representing the user-selectable region at a first point in time and a second matrix representing the user-selectable region at a second point in time. In one embodiment, the matrix generated by this interpolation is then applied to a region definition for the user-selectable region to determine the specific area occupied by the region at the particular point in time.

In one embodiment, the first matrix and the second matrix are both stored within the same sample of a container track. This sample corresponds to one or more frames of the sequence of display frames. In an alternate embodiment, the first matrix and the second matrix are stored in two separate samples of the container track.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should become in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
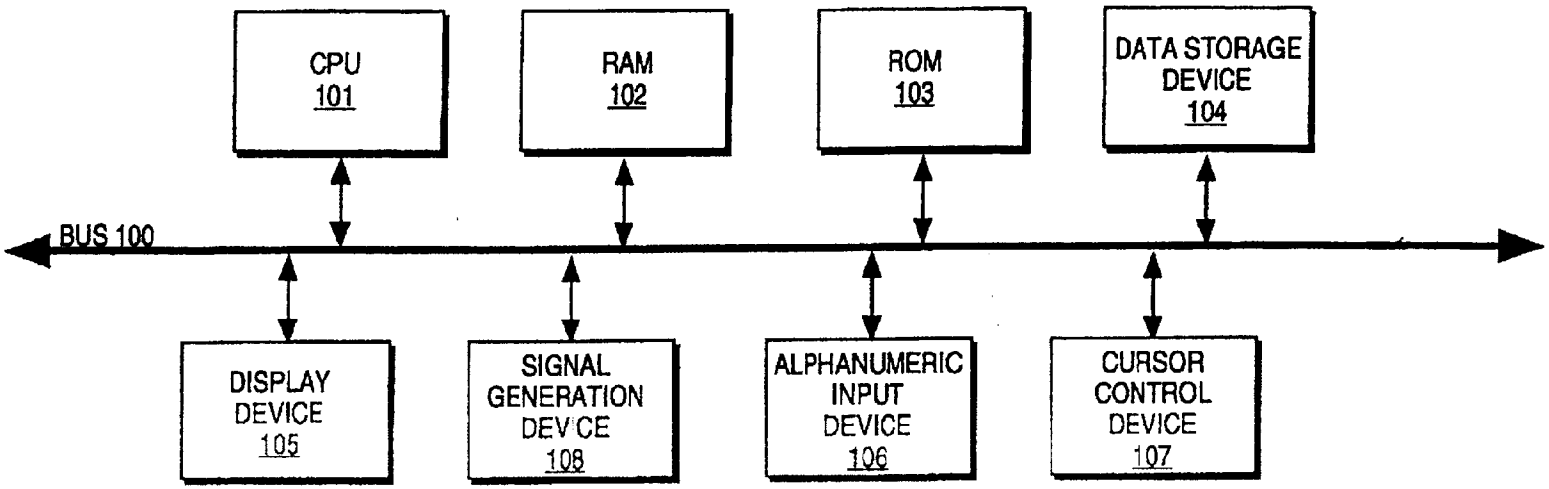
FIG. 1 shows a computer system used by one embodiment of the present invention.

In general, computer systems used by one embodiment of the present invention as illustrated in block diagram format in FIG. 1, comprise a bus 100 for communicating information, a central processing unit (CPU) 101 coupled with the bus for processing information and instructions, a random access memory (RAM) 102 coupled with the bus 100 for storing information and instructions for the CPU 101, a read only memory (ROM) 103 coupled with the bus 100 for storing static information and instructions for the CPU 101, a data storage device 104 such as a magnetic or optical disk and disk drive coupled with the bus 100 for storing information (such as audio or video data) and instructions, a display device 105 coupled to the bus 100 for displaying information to the computer user, an alphanumeric input device 106 including alphanumeric and function keys coupled to the bus 100 for communicating information and command selections to the CPU 101, a cursor control device 107 coupled to the bus for communicating user input information and command selections to the CPU 101, and a signal generating device 108 coupled to the bus 100 for communicating information and instructions to the CPU 101.

In one embodiment of the present invention, signal generating device 108 includes, as an input device, a standard microphone to input audio or voice data to be processed and stored by the computer system. The signal generation device 108 includes an analog to digital converter to transform analog voice data to digital form which can be processed by the computer system. In one implementation, signal generation device 108 also includes a specialized tape cassette player to input stored voice or audio data to the CPU 101 and the remainder of the system over bus 100. The signal generation device 108 also includes, as an output, a standard speaker for realizing the output audio from input signals from the computer system. Signal generation device 108 also includes well known audio processing hardware to transform digital audio data to audio signals for output to the speaker, thus creating an audible output.

The display device 105 utilized with the computer system and the present invention may be a liquid crystal device, cathode ray tube, or other display device suitable for creating graphic images and alphanumeric characters (and ideographic character sets) recognizable to the user. The cursor control device 107 allows the computer user to dynamically signal the two dimensional movement of a visible symbol (for example, a pointer or cursor) on a display screen of the display device 105. Many implementations of the cursor control device are known in the art including a trackball, trackpad, mouse, joystick or special keys on the alphanumeric input device 106 capable of signaling movement of a given direction or manner of displacement. It is to be appreciated that the movement of a cursor or pointer also may be directed and/or activated via input from the keyboard using special keys and key sequence commands. Alternatively, the cursor may be directed and/or activated via input from a number of specially adapted cursor directing devices, including those uniquely developed for the disabled. Alternatively, display device 105 may be a touch-screen device, where a user can input selections by touching the screen of display device 105. Additionally, cursor control 107 may also be a three-dimensional input device which allows the computer user to dynamically signal the three dimensional movement of a visible symbol. In the discussions regarding cursor movement and/or activation below, it is to be assumed that the input cursor directing device or push button may consist of any of those described above and specifically is not limited to the mouse cursor device.

It is to be appreciated that some of the components shown in FIG. 1 may not be included in systems used by the present invention and that additional components may be added to the system of FIG. 1. For example, a microphone may not be included within signal generation device 108. Alternatively, additional processors similar to CPU 101, a digital signal processor(s), or a graphics coprocessor(s) may be added to the system.

The present invention can operate effectively on a desktop computer system, such as a Macintosh™ platform available from Apple Computer Inc., of Cupertino, Calif. It is to be appreciated, however, that the Apple computer system is only one of many computer systems that may support the present invention.

In one embodiment, the present invention is implemented as a series of software routines run by the computer system of FIG. 1. In one implementation, these software routines are written in the C++ programming language. It is to be appreciated, however, that these routines may be implemented in any of a wide variety of programming languages. In an alternate embodiment, the present invention is implemented in discrete hardware or firmware.

The present invention identifies user-selectable regions on a display device. In the following discussion, a "user-selectable region" refers to any location on a display device which can be selected by a user. A "hot button" is one such user-selectable region. A hot button may be displayed as a button on the display device or may be hidden from view. An example of a displayed hot button is a rectangular button displayed on a screen with the word "help" displayed within it. By selecting that button, the user is able to receive whatever help information is associated with the button. A hidden button, on the other hand, is a region on the display device which can be selected by the user but which is not explicitly identified as a button. For example, a hidden button may correspond to the head of an individual or an open doorway. Although these regions are not specifically identified as buttons to the system user, the user can still select the regions.

The selection of a hot button by a user may be done in any of a wide variety of manners. In one embodiment, selection is made by positioning a display pointer over the region, such as by utilizing a cursor control device, stylus or pen. Once positioned over the region, the pointer is activated, such as by depressing and releasing (that is, "clicking") a mouse button. In an alternate embodiment, selection is made by merely positioning a display pointer over the region; no activation of a mouse or similar button is necessary. In another alternate embodiment, the display device is a touch-sensitive screen. In this embodiment, a hot button can be selected by touching the appropriate location on the screen with, for example, a pen or a finger. In yet another alternate embodiment, the display device is a light-sensitive screen. In this embodiment, a hot button can be selected by touching the appropriate location on the screen with a light pen.

In the following discussion, the term "media sequence" refers to a plurality of ordered data blocks or frames. A video track, for example, is a media sequence in which each data block contains video data representing an image. Similarly, a sound track is a media sequence in which each data block contains audio data representing sound.

The term "media container" refers to a data structure that includes one or more media sequences. A QuickTime™ movie is a media container in that it stores multiple media sequences, such as video tracks, audio tracks, sound tracks, text tracks, etc. For additional information on QuickTime™ movies, refer to Inside Macintosh QuickTime (Addison-Wesley Publishing Company, Reading Mass., 1993). All of the media sequences that belong to a media container are sequenced according to a common time coordinate system.

Media sequences may be either "time-based" or "time-independent". Time-based media sequences are media sequences in which the progression from one frame to the next is based on the passage of time. A video track is an example of a time-based media sequence. During playback, a frame in a video media sequence is displayed for a set time interval. After the time interval expires, the next frame in the video media sequence is displayed. This process continues until all of the frames in the video media sequence have been displayed. The time interval may be modified to speed up or slow down playback, but the playback timing is still driven by the passage of time.

A time-independent media sequence is a media sequence in which the progression from one frame to the next is based on an event other than the passage of time. For example, consider a media sequence in which each frame contains the text of a page in a novel. During playback, the page represented in a frame should be displayed until the reader has completed reading the page. Since reading speeds vary greatly, the playback mechanism should not display the page associated with the next frame until the reader indicates a desire to turn the page. Thus, a mechanism may be provided to the user through which the user may initiate an event to move to the next page. For example, a user may operate a mouse or other pointing device to click on a "Turn Page" button to cause the playback mechanism to sequence to the next frame.

In one embodiment, media containers are "slaved" to a clock; that is, the clock determines when the media sequences that belong to the media container progress from one frame to the next. All of the media sequences in a typical movie are slaved to the same clock (the "movie clock") to ensure that the media sequences remain synchronized during playback. Each cycle of the clock represents a predetermined time interval for a time-based media sequence. However, cycles of the clock can be tied to different events (e.g., for a time-independent movie) rather than specific time intervals.

A sequencing direction is the direction in which a media sequence is played relative to the order of the frames. Because media sequences are "ordered", all media sequences have at least two possible sequencing directions. For the purposes of discussion, these two sequencing directions will be referred to as "forward" and "backward". However, it should be understood that "forward" does not necessarily mean the "normal" or "typical" direction, since some applications may process media sequences in one direction, other applications may process media sequences in the other direction, and yet other applications may process sequences in either or both directions.

In one embodiment of the present invention, the mechanism for playing a movie is implemented through a series of instructions executed on CPU 101 of FIG. 1. Initially, the series of instructions may be stored on storage device 104. When the playback mechanism is invoked, the instructions are copied from storage device 104 into RAM 102, and then accessed and executed by CPU 101.

During execution of the series of instructions, the frames of the media sequences of a movie are processed by CPU 101 responsive to the series of instructions. Specifically, CPU 101 causes the frames to be "played". The particular steps for playing a frame depend on the nature of the data within the frame. For example, a frame of video data is "played" by causing the image represented in the frame to be displayed on display device 105. Frames containing audio data are played by generating the sound represented in the audio frame. Sound may be generated, for example, on a speaker of signal generation device 108.

CPU 101 sequences through the movie responsive to the series of instructions. The series of instructions may cause CPU 101 to sequence through the movie responsive to the passage of time and/or the occurrence of an event. An event which causes CPU 101 to sequence to the next frame in a media sequence may be a user-actuated event, such as the selection of a key on alphanumeric input device 106, or the operation of a user-interface control through actuation of cursor control device 107.

Figure 2:
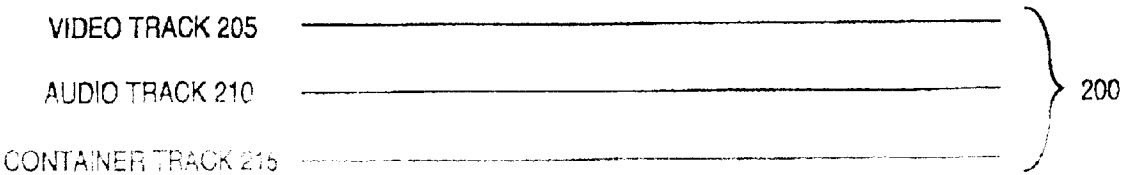
FIG. 2 shows an example of a movie in accordance with the present invention.

FIG. 2 shows an example of a movie which may be played on the system of FIG. 1. A movie 200 is shown comprising a video track 205, an audio track 210, and a container track 215. Video track 205 is a media sequence in which each frame is a display frame. That is, each frame contains an image for display on a display device. Audio track 210 is a media sequence in which each frame contains a single frame of audio data to be played by the system. These sequences of video and audio frames are sequenced to be played in the forward direction.

Each frame of video track 205 can be any graphical representation of an image. For example, the frame may be an image of an animated figure, a frame from a series of computer-generated animation images, a digitized photograph, a combination of animation and text, etc. It is to be appreciated that although the discussions which follow discuss video frames, the present invention applies analogously to frames of animation and other graphical representations which can be displayed.

Container track 215 includes multiple container track frames, also referred to as "samples", corresponding to the video track 205. Each sample of container track 215 contains control information corresponding to one or more video frames of video track 205. The control information included within each sample of container track 215 contains the information necessary to identify the location of one or more user-selectable regions on the display device. In one implementation, multiple samples of container track 215 can correspond to a single video frame of video track 205. This may occur, for example, if a single video frame is displayed for more clock cycles of the movie clock, discussed in more detail below, than the corresponding sample of container track 215.

Each frame of video track 205 typically corresponds to multiple hot buttons. In one embodiment of the present invention, movie 200 includes multiple container tracks 215, each including a different hot button(s) corresponding to video track 205. In this embodiment, user inputs are compared to the control information stored in each of the multiple container tracks 215 to determine which region of the display device, if any, is selected. In an alternate embodiment, movie 200 includes a single container track 215. In this embodiment, the control information used to identify each of multiple hot buttons is contained within the single container track 215. In one implementation, the control information for each of the hot buttons is linked together utilizing a linked-list structure.

Container track 215 includes two types of frames or samples, referred to as key samples and override samples. Each frame of video track 205 corresponds to at least one sample of container track 215. A key sample contains all of the information necessary to identify a user-selectable region. An override sample contains information which changes at least one aspect of a user-selectable region defined in the most recent key sample. By combining the information in the override sample with the key sample, all of the information necessary to identify the user-selectable region is available.

In one embodiment, container track 215, audio track 210 and video track 205 are slaved to the same movie clock. Thus, at any given point in time during the display of movie 200, the system can determine which sample of container track 215 corresponds to the video frame being displayed at that time. It should be noted that, although the tracks are slaved to the same movie clock, the passage of one clock cycle or event does not necessarily result in the next sample of container track 215 being the current sample. As discussed above, each sample of container track 215 can correspond to one or more video frames. Thus, multiple clock cycles or events may pass before the next sample becomes the current sample.

In one embodiment of the present invention, key samples are distinguished from override samples using a key sample table. The key sample table stores a listing of which time periods of the movie clock correspond to which key samples of container track 215. Upon receiving a selection from a system user, the system indexes into the key sample table based on the time according to the movie clock at which the selection was made. If a particular time period is listed, then the sample corresponding to the time period is a key sample. If a particular time period is not listed in the table, then the sample corresponding to the time period is an override sample, and the most recent key sample is the immediately preceding key sample in the table. The override sample which corresponds to the video frame can then be determined based on the time according to the movie clock at which the selection was made. Thus, given any particular time, the present invention can determine whether the corresponding sample of container track 215 is a key sample or an override sample. Furthermore, if the sample is an override sample, the present invention can determine which key sample is the preceding key sample.

Alternatively, the key sample table may store a listing of video frames rather than time periods. In this embodiment, the key sample table indicates which video frames of video track 205 correspond to which key samples of container track 215. This listing is stored according to the sequence order of the video frames, thereby allowing the present invention to determine which key samples correspond to video frames which are displayed prior to and/or subsequent to which other video frames.

In another alternate embodiment of the present invention, each sample in the container track 215 includes an identification field. This identification field contains one of two values; the first value indicates the sample is a key sample and the second value indicates the sample is an override sample. Thus, in this embodiment a separate key sample table is not required to determine whether a sample is a key sample or an override sample.

Figure 3A:
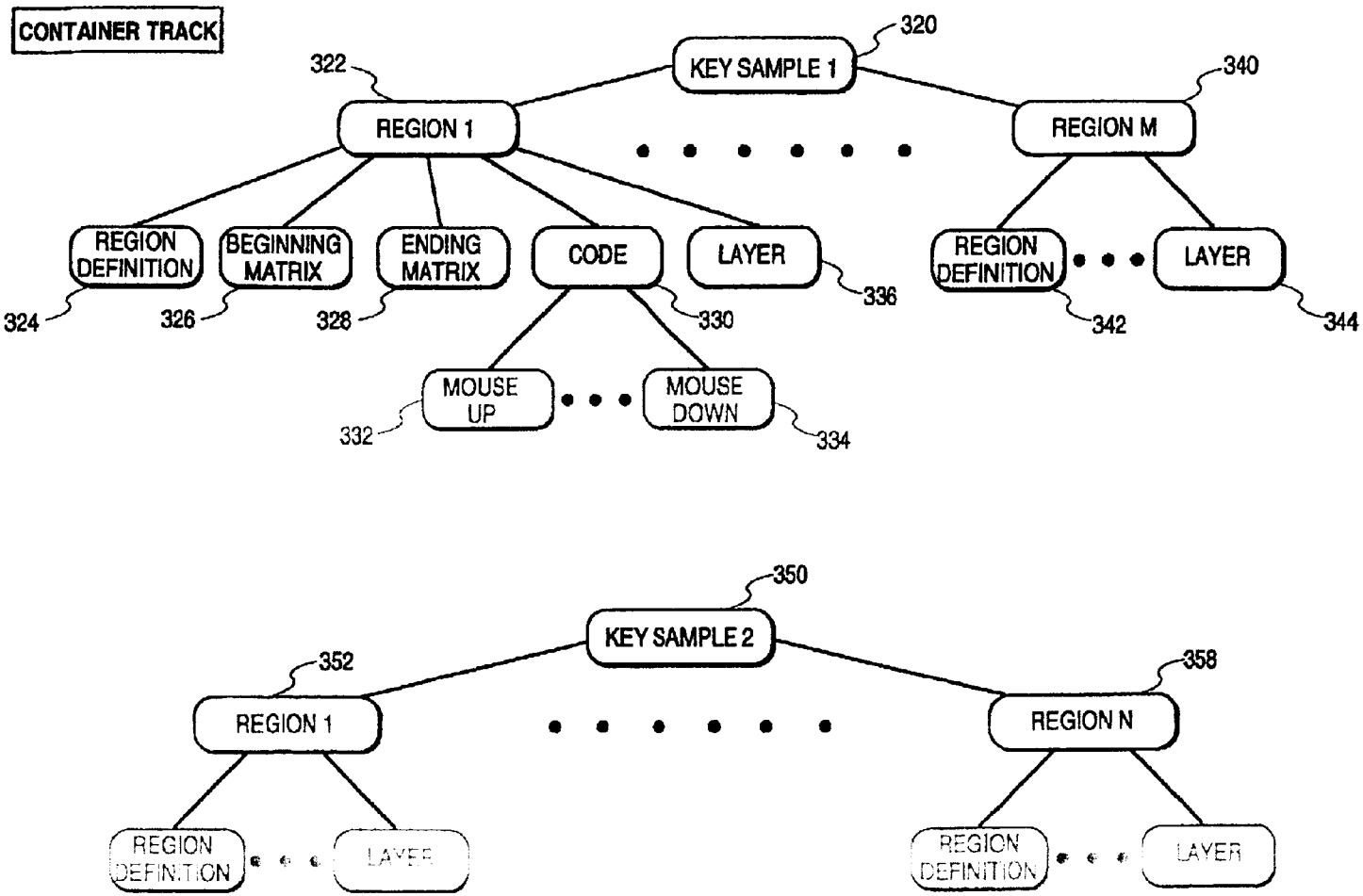
FIG. 3A shows key samples of a container track according to one embodiment of the present invention.

FIG. 3A shows two key samples 320 and 350 according to one embodiment of the present invention. Key sample 320 is shown in a tree form containing M regions and multiple lower level nodes, also referred to as "children". Similarly, key sample 350 is also shown in a tree form containing N regions and multiple nodes. It is to be appreciated that key samples 320 and 350 can contain any number of regions. In one embodiment, key samples 320 and 350 are stored as a data structure (for example, a linked list) in RAM 102 of FIG. 1.

Region 322 is shown as part of key sample 320 and includes a region definition 324, a beginning transformation matrix 326, an ending transformation matrix 328, a code 330, and a layer indicator 336. Region 322 corresponds to a user-selectable region defined by key sample 320. In one implementation, region 322 includes a label or identifier for the user-selectable region which allows subsequent override samples to alter aspects of the region, as discussed in more detail below.

Given the region definition 324, the beginning transformation matrix 326 and the code 330, the system is able to identify the user-selectable region and take the appropriate action if the region is selected by a user. The ending transformation matrix 328 and layer indicator 336 provide further definition and flexibility for the user-selectable region, as discussed in more detail below. Similarly, region 340 also contains multiple nodes analogous to those in region 322, including region definition 342, layer 344, etc.

Region definition 324 provides a definition of the user-selectable region. In one embodiment of the present invention, the definition of a region is a two-dimensional 1-bit mask. That is, the definition indicates which points are part of the user-selectable region and which points are not.

Thus, the region being defined can be any arbitrary shape. In one embodiment of the present invention, region definition 324 is a QuickDraw™ region. For additional information on QuickDraw™ regions, refer to Inside Macintosh Imaging with QuickDraw (Addison-Wesley Publishing Company, Reading Mass., 1994). In an alternate embodiment, region definition 324 is a QuickDraw™ GX path. In another alternate embodiment, region definition 324 is a three-dimensional definition of a region to be displayed on a two-dimensional display device.

The user-selectable region may be defined in any of a wide variety of conventional manners. In one embodiment, the region is defined by identifying only the points on the outline of the image. That is, the definition includes a list of each point on the outline of the image, but not on the interior. In an alternate embodiment, the region is defined by identifying every point for the image. That is, the definition includes a list of each point of the image, including points located on the outline and within the area defined by the outline.

Additionally, various resolution levels may be utilized in defining the user-selectable region. In one implementation, region definition 324 is a high-resolution definition and the image is scaled down utilizing the beginning transformation matrix 326. Such an implementation is useful when a description of the region is available which is of a higher resolution than the resolution capabilities of the display device. In an alternate implementation, region definition 324 is a low-resolution definition, and the image is scaled up utilizing the beginning transformation matrix 326. This implementation is useful to save storage space for the region when an exact display area for the region is not required. For example, given modern screen resolutions, a selection within one or two pixels of the ideal location is an acceptable result, providing little (if any) noticeable loss of accuracy.

In an alternate embodiment, region definition 324 provides a three-dimensional region definition. The region definition is made utilizing any of a wide variety of conventional modeling techniques. For example, the region definition may be generated by using three-dimensional modeling techniques for images displayed on a two-dimensional display device. By way of another example, the region definition may be generated by using a three-dimensional input device.

Region definition 324 provides an outline of the region based on its own graphical coordinate system. Region definition 324 does not, in and of itself, necessarily indicate the area on the display device which the user-selectable region occupies at any given time. The actual area the region occupies on the display device is determined by applying the beginning transformation matrix 326 to the region, as described below. In the descriptions which follow, the region definition is described as being transformed by a matrix. However, it is to be appreciated that the present invention can use any of a wide variety of conventional transformation functions to determine the are the region occupies on the display device, and specifically is not limited to a matrix.

The beginning transformation matrix 326, when applied to the region definition 324, provides the area that the region occupies on the display device at the point(s) in time that the container track sample corresponds to the video frame. In one embodiment of the present invention, the transformation matrix 326 is a 3-by-3 matrix, such as transformation matrix A shown below.

Transformation Matrix A $$\begin{bmatrix} a & b & c \\ d & e & f \\ g & h & i \end{bmatrix}$$

The area the region occupies on the display device at any particular point in time is determined by applying the beginning transformation matrix 326 to the two-dimensional region definition 324. The beginning transformation matrix 326 is "applied" to the region definition 324 by multiplying each point contained in the two-dimensional region definition 324 by the beginning transformation matrix 326 using vector multiplication. In one implementation, each point is converted to a 1-by-3 matrix (that is, a 3-element vector), including the x position of the point, the y position of the point, and a value of 1. By multiplying each point by the beginning transformation matrix 326, the region definition is mapped to its proper location on the display device for this video frame.

The beginning transformation matrix 326 allows the region definition to be mapped to a different location on the screen and to be rotated, flipped, scaled, etc. The location of the user-selectable region can be translated to a different location on the screen in the x direction by changing the value of element g of transformation matrix A. Analogously, the location of the region can be translated to a different location in the y direction by changing the value of element h of transformation matrix A. Scaling operations in the x and y directions can be performed by changing the values of elements a and e, respectively. Values between 0 and 1.0 cause the region to be scaled down in size, values greater than 1.0 cause the region to be scaled up in size. A negative value for elements a and e cause the region to be flipped along the x and y axes, respectively. Rotation operations can be performed by inserting the appropriate trigonometric functions into elements a, b, d and e of the transformation matrix. For example, values of $\cos(\theta)$, $\sin(\theta)$, $-\sin(\theta)$, and $\cos(\theta)$ for elements a, b, d and e, respectively, cause the region definition to be rotated counterclockwise by an angle $\theta$.

Once the region definition 324 is mapped to its proper location on the display device for the video frame, the system can check whether the pixel location selected by the user is a selection of this hot button. If the pixel location is within the area defined by the location on the display device for the button, then the button has been selected. Otherwise, the button has not been selected.

In an alternate embodiment of the present invention, the determination of whether a selection by a user is for a particular button is performed by applying the pixel location selected by the user to the inverse of the transformation matrix. By multiplying the selection by the inverse of the transformation matrix, the pixel location is mapped into the same graphical coordinate system as the region definition is in. Thus, the system can determine whether the pixel selected is included within the region definition.

It is to be appreciated that although the above discussion describes a two-dimensional region definition and transformation matrix, the present invention applies analogously to a three-dimensional region definition. The three-dimensional region definition and corresponding transformation matrix can be generated utilizing conventional modeling techniques.

Code 330 identifies the action to be performed if the region described in region definition 324 is selected by a system user. Code 330 as shown contains two lower level or children nodes, mouse up node 332 and mouse down node 334. Each of these lower level nodes indicates the action to be taken by the system if that particular event occurs in the system. In one embodiment of the present invention, each of the nodes below code 330 indicate a set of instructions stored within the computer system's memory which are to be executed. These instructions may be stored, for example, within RAM 102, ROM 103, or storage device 104 of FIG. 1. In one implementation, a node below code 330 indicates a second media container which should be executed upon selection of the region definition. In an alternate embodiment, a node below code 330 includes multiple instructions which are to be executed upon selection of the region.

The number of nodes below code 330 depends on the different system events which could trigger actions when the region is selected. As shown in FIG. 3A, two system events could trigger actions: a mouse up event and a mouse down event. It is to be appreciated that any conventional system event could trigger actions, including cursor or pointer movement events, cursor or pointer location, keyboard actions, etc.

Figure 4:
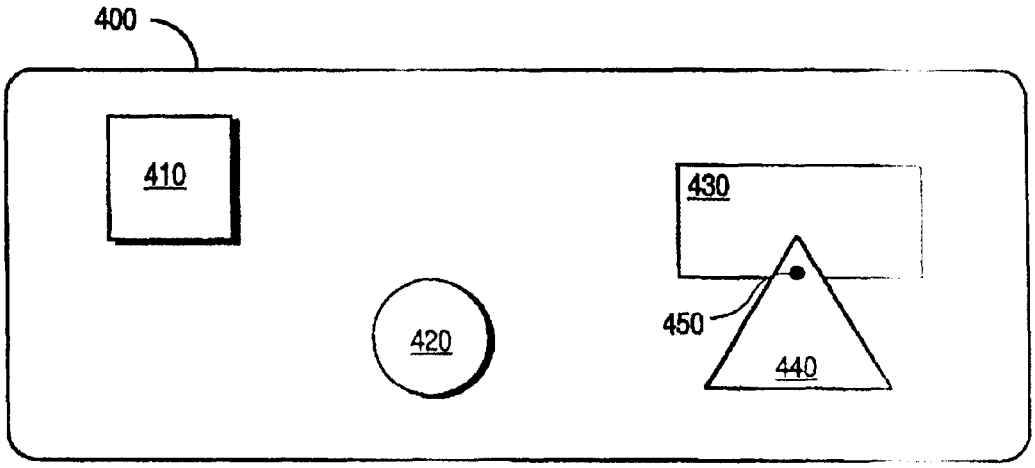
FIG. 4 shows an example display frame in accordance with the present invention.

A layer indicator 336 is also optionally included in key sample 320. Layer indicator 336 provides a value to indicate the depth of an object in relationship to other objects being displayed. For example, a display screen 400 is shown in FIG. 4. Display screen 400 contains four hot buttons: square 410, circle 420, rectangle 430, and triangle 440. As shown in FIG. 4, triangle 440 overlays rectangle 430; thus, if a user were to make a selection at the point 450, the computer system should identify triangle 440 as being selected rather than rectangle 430. Layer indicator 336 provides a solution to this situation. When triangle 440 overlays rectangle 430, triangle 440 contains a higher value in layer indicator 336 than rectangle 430. Correspondingly, when rectangle 430 overlays triangle 440, rectangle 430 contains a higher value in layer indicator 336 than triangle 440. Thus, when a user selection is made at point 450, the computer system checks the hot buttons of the highest layer to determine if the selected point is contained in a hot button of that layer. If a hot button of the highest layer does contain that point, then the computer system identifies that hot button as the selected object. However, if a hot button of the highest layer does not contain that point, then the computer system checks the hot buttons of the next highest layer to determine if the selected point is contained in a hot button of that layer. The computer system continues checking layers until a selected button is identified or no unchecked layers remain.

In an alternate embodiment, when a user selection is made at point 450, the computer system determines that the point could correspond to either triangle 440 or rectangle 430. The computer system then determines which of the two objects contains a higher value in layer indicator 336 and identifies the selected object as the object having the higher layer indicator.

An ending transformation matrix 328 is also optionally included in region 322. Ending transformation matrix 328, in combination with beginning transformation matrix 326, allows a single key sample to identify a user-selectable region which changes over time. The beginning transformation matrix 326 provides the display area for the region corresponding to the first of the multiple video frames. The ending transformation matrix 328 provides the display area for the region corresponding to the last of the multiple video frames. Then, by interpolating between the beginning transformation matrix 326 and the ending transformation matrix 328, the display area for the region corresponding to any of the intermediary times can be determined.

In one embodiment of the present invention, linear interpolation is used to interpolate between beginning transformation matrix 326 and ending transformation matrix 328. It 328, the display area for the region corresponding to any of the intermediary times can be determined.

In one embodiment of the present invention, linear interpolation is used to interpolate between beginning transformation matrix 326 and ending transformation matrix 328. It is to be appreciated, however, that other types of interpolation may be used in place of linear interpolation. For example, an interpolation process may be used which accounts for acceleration of the region. By way of another example, an interpolation process may be used which rotates the region a predetermined number of times over a predetermined duration.

Using two transformation matrices is particularly useful in applications where the hot button is moving at a constant, known rate, such as in animation. For example, a sequence of video frames may define movement of an individual from a beginning location to an ending location in twenty equally timed steps. If a hot button is associated with the individual, the beginning transformation matrix corresponds to the beginning location of the individual and the ending transformation matrix corresponds to the ending location of the individual, and the area occupied by the hot button in each intermediary video frame corresponds to an interpolated matrix between the beginning and ending transformation matrices. Therefore, a hot button for twenty video frames can be stored requiring only a single region definition for the button and two transformation matrices.

Thus, by utilizing the two transformation matrices within the same key sample, movement of the hot button can be represented in a memory-efficient manner. The system need merely maintain the region definition and the two transformation matrices to correctly identify the hot button over multiple video frames.

By way of another example, assume key sample 320 corresponds to m video frames in video track 205 of FIG. 3. Further assume that the beginning transformation matrix 326 and the ending transformation matrix 328 are as shown below:

Beginning Matrix $$\begin{bmatrix} a & b & c \\ d & e & f \\ g & h & i \end{bmatrix}$$

Ending Matrix $$\begin{bmatrix} a' & b' & c' \\ d' & e' & f' \\ g' & h' & i' \end{bmatrix}$$

Given these two matrices, the computer system identifies the area occupied by the user-selectable region in the first frame by applying beginning transformation matrix 326 to the region definition 324. The area occupied by the region in frame m is identified by applying ending transformation matrix 328 to the region definition 324. The area occupied by the region in frame n, where $1<n<m$ is identified by linearly interpolating between beginning matrix 326 and ending matrix 328 to generate a third transformation matrix, and then applying that third transformation matrix to the region definition 324. Each scaling or moving element of the interpolation matrix is determined according to the following calculation.

$$xj = \frac{x' - x}{m - 1} \cdot (n - 1) + x$$

where $x_i$ is the element of the interpolation matrix being determined, x' is the corresponding element of the ending transformation matrix, x is the corresponding element of the beginning transformation matrix, m is the total number of video frames corresponding to the container track sample, and n is the current video frame in which the area occupied by the hot button is being determined. Similarly, each rotational element of the interpolation matrix is generated by using conventional methods to interpolate between the rotational values in the beginning and ending matrices, if any.

It is to be appreciated that, due to the nature of the transformation matrices, any type of movement of the user-selectable region can be accounted for in key sample 320. For example, the movement of the region may be a direct movement from a first position to a second position with the profile of the region remaining unchanged, such as a rectangular object being "moved" across the screen. By way of another example, the region may correspond to the head of an individual being displayed and the movement of the region may correspond to the rotation of the individual's head.

Thus, hot buttons which are defined utilizing beginning and ending transformation matrices can be said to have a time duration. This time duration of a hot button is equal to the amount of time the transformation matrices of the key sample correspond to the video frame, and can be referenced in terms of the movie clock time, number of video frames, etc. As discussed above, the key sample can correspond to an entire video frame, multiple video frames, or only a portion of a video frame. The sample immediately following a key frame sample is either another key frame sample which re-defines the hot button, or an override sample which changes the hot button, as described below.

It is to be appreciated that the interpolation process described above is applicable to other aspects of a media sequence as well as the transformation matrix. For example, container track 215 of FIG. 2 may include additional key samples and override samples which correspond to audio track 210. These samples contain node structures analogous to those shown in FIG. 3. One such node could represent, for example, a sound definition (analogous to the region definition), with a beginning and ending volume (analogous to the beginning and ending transformation matrices). Sound volumes between the beginning and ending volumes could then be generated by interpolating between the two volumes.

The tree structure of FIG. 3A also allows multiple nodes of a sample to share nodes. In one implementation, this is done by having a node contain a pointer to another node. For example, region definition 342 of region 340 may contain a pointer to region definition 324 of region 322, thereby allowing a single region definition to be used for two different user-selectable regions. These two user-selectable regions could then be placed at different locations on the display device using a different beginning and/or ending transformation matrix.

By way of another example, multiple regions may share the same region definition and beginning transformation matrix, but contain different ending transformation matrices. This is accomplished by generating a region definition node and beginning transformation matrix node for one of the multiple regions. Then a pointer to this region definition and this beginning transformation matrix is placed in the region definition and beginning transformation matrix nodes of the other regions. Such a system provides efficient storage for identical objects in the frames which have motion following different paths in the frames. One such example is a series of video frames starting with a single star in the middle of the display which quickly breaks into four stars, each of which travels towards a different one of the four corners of the display device. In this example, a single region definition contains the definition of the star, a single beginning transformation matrix contains the starting location of each of the four stars, and four different ending matrices contain the ending locations of each of the four stars. Intermediate locations for each of the four stars are generated by interpolating between the corresponding ending transformation matrices and the beginning transformation matrix.

Key sample 350 is a second key sample in the container track and is analogous to key sample 320. Key sample 350 includes N regions 352 and 358, each containing region definitions, transformation matrices, layers, etc. In one embodiment, key sample 350 and key sample 320 each contain a label or an identifier which allows subsequent override samples to identify which key sample they correspond to.

Figure 3B:
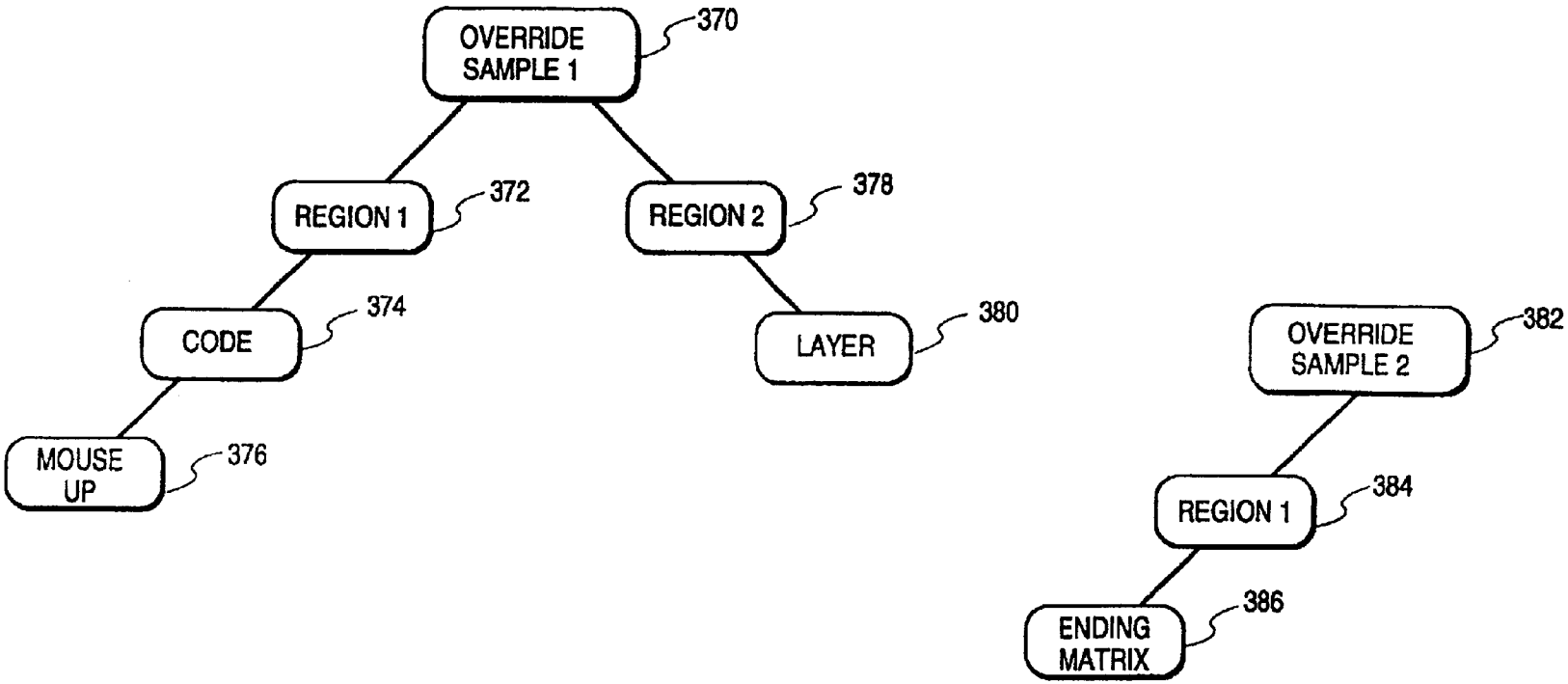
FIG. 3B shows override samples of a container track according to one embodiment of the present invention.

The second type of sample which may be included in container track 215 is an override sample, shown in FIG. 3B. The override sample provides replacement information for any one or more of the nodes stored in the immediately preceding key sample. For example, an override sample may contain replacement nodes for one or both matrices, code sections, or the layer indicator. Additionally, an override sample may also contain new nodes which did not exist in the preceding key sample (e.g., a region, a code section for a certain event, or an ending transformation matrix). One or more override samples may follow a key sample. Two such samples are shown in FIG. 3B as override sample 370 and override sample 382.

Override sample 382 contains an identifier which indicates which of the key samples in the container track this override sample corresponds to. In the sample shown in FIG. 3B, override sample 382 corresponds to key sample 320 of FIG. 3A. Override sample 382 includes region 384 and ending transformation matrix 386. Region 384 indicates which region from the preceding key sample this override sample is modifying. Ending transformation matrix 386 provides a new transformation matrix which is used by the computer system in place of the ending transformation matrix from the preceding key sample. Thus, if a user selection is made in a video frame corresponding to override sample 386, an interpolation matrix is generated by interpolating between beginning matrix 326 of key sample 320 and ending matrix 386 of override sample 382, and then applying the interpolation matrix to region definition 324 of key sample 320 to identify the display area for the region. It will be appreciated that the region definition for a hot button typically requires much more storage area than that required for a nine-element transformation matrix. Thus, changes in the display area of the region can be made in a memory-efficient manner, requiring storage of only the new transformation matrix rather than repeated storage of the region definition.

By way of another example, override sample 382 could contain both a beginning transformation matrix and an ending transformation matrix. If the ending transformation matrix were a null value, then the single beginning transformation matrix would replace both beginning matrix 326 and ending matrix 328 of key sample 320. An example of replacing both matrices is a hot button which moves at a constant rate from a first area to a second area on the display, then jumps to a third area. Movement of the hot button from the first area to the second area can be represented by the beginning and ending matrices within key sample 320. The jump to the third area can be represented by the transformation matrix in the override sample 382.

By way of another example, an additional ending transformation matrix can also be included in override sample 382. Thus, a hot button may move at a constant rate from a first area to a second area in one direction on the display, and then move from the second area to a third area in another direction. This movement can be represented by two sets of beginning and ending matrices and a single region definition.

Override sample 370 includes region 372 and region 378, which indicate the regions of the preceding key sample being modified. Override sample 370 as shown corresponds to the preceding key sample 320 of FIG. 3A. Region 372 includes a code 374 and a mouse up node 376, which provides a replacement code for the immediately preceding key sample. In override sample 370, mouse up code 374 replaces mouse up code 332 of key sample 320. Thus, if a user selection is made in a video frame corresponding to override sample 370, an interpolation matrix is generated based on beginning matrix 326 and ending matrix 328. The interpolation matrix is then applied to region definition 324, and if the selection is a mouse up event which corresponds to the identified area, then mouse up code 376 of override sample 370 is performed rather than mouse up code 332 of key sample 320. Therefore, the override sample 370 provides a memory-efficient manner in which to change the resultant action from user-selection of a hot button which does not require repeated storage of either the region definition or the transformation matrix.

Override sample 370 shows a single code section being updated (that is, code for a mouse up event). It is to be appreciated, however, that any or all of the different codes for code 330 can be replaced in an override sample. Similarly, code for additional events can be added in an override sample even if the preceding key sample contained no code for those additional events.

Override sample 370 also includes a region 378 and layer indicator 380. Region 378 identifies a second of the M regions from key sample 320 which is being modified by override sample 370. Layer indicator 380 contains the modification, providing a new layer value for the preceding key sample.

In one embodiment of the present invention, the override samples following a key sample build upon one another. That is, when a user-selection is made which corresponds to an override sample, then any new information in a previous override sample that is not replaced by information from a subsequent override sample is combined with the current override sample and the preceding key sample. For example, assume two override samples follow a key sample and the latter override sample is the current override sample. If the current override sample contains a replacement transformation matrix and the preceding override sample contains a replacement code, then the transformation matrix of the current override sample is applied to the region definition of the preceding key sample, and if the selected area matches the current location of the region, then the code in the preceding override sample is performed. Similarly, a third override sample having a new transformation matrix could follow these two override samples, and a user-selection corresponding to this third override sample would result in the transformation matrix from the third override sample being applied to the region definition of the key sample rather than the transformation matrix from the second override sample.

In an alternate embodiment, override samples following a key sample do not build upon one another. That is, if a user-selection is made which corresponds to an override sample, then the replacement information in that override sample is combined with the preceding key sample to identify the location of the region, without regard for any information in interceding override samples.

Thus, the present invention provides a memory-efficient manner in which to provide hot buttons having time durations and/or changing characteristics. For example, movie 200 may be a video catalog which displays a showroom and where the movie pans around the showroom. When a particular item, such as a sofa, corresponding to a hidden hot button is selected by the user, the user is provided with a detailed description of the item, such as manufacturer, features, price, etc. Each hot button corresponding to each of the showroom items need not be repeatedly stored, only the single region definition for the item is stored along with transformation matrices indicating the items "movement" as the user pans around the showroom.

By way of another example, movie 200 may be an animated movie of a person walking across the screen. When a hot button (such as the individual's head) is selected, the code corresponding to the button is performed. Again, the hot button for the individual's head requires storing only the original region definition for the head and the transformation matrices indicating the movement of the individual's head across the screen.

In one embodiment of the present invention, each user-selectable region includes an identifying name or key words. Utilizing this identifying information the present invention can provide improved indexing capabilities for movies. A search can be performed through the container track for a set of search parameters, such as the desired identifying name or key words and an associated display area or movement. For example, a search could be done for all instances where a particular region corresponding to an individual is moving from left to right, or when the particular region is in the lower right-hand corner of the display device.

It is to be appreciated that the present invention is applicable to a wide range of media sequences and is not limited to display frames. For example, the present invention is applicable to audio frames as well as display frames. In one embodiment, when samples of the container track correspond to the audio track, the region definitions of these container track samples identify audio data from the audio track. The audio data can then be modified by transformation functions (for example, to alter the volume, to change the pitch, etc.), analogous to the discussion above. User-selection of the region definition is analogous to the discussion above regarding user-selection of a display frame, except that the tone does not exist at a particular area of the display device. Rather, user-selection of the region definition occurs when the user performs a selecting action (for example, moving the cursor or clicking on a particular mouse button) when the audio data is being played. The action taken upon user-selection of the tone depends on the code associated with the region definition, analogous to the discussion above. Furthermore, different layers can be used to determine which of multiple sounds being played simultaneously has been selected. Additionally, different aspects of the regions can be changed using override samples, analogous to the discussion above.

It is also to be appreciated that the modification of frames using override samples as discussed above can be used in any of the media sequences and is not limited to the container track of a movie. For example, the audio frames of an audio track can contain audio data in a key sample frame which is modified by a subsequent override sample. This modification is analogous to those discussed above, such as altering the volume, pitch, etc. of a tone, or changing the layer value of the tone defined in the key sample.

Figure 5:
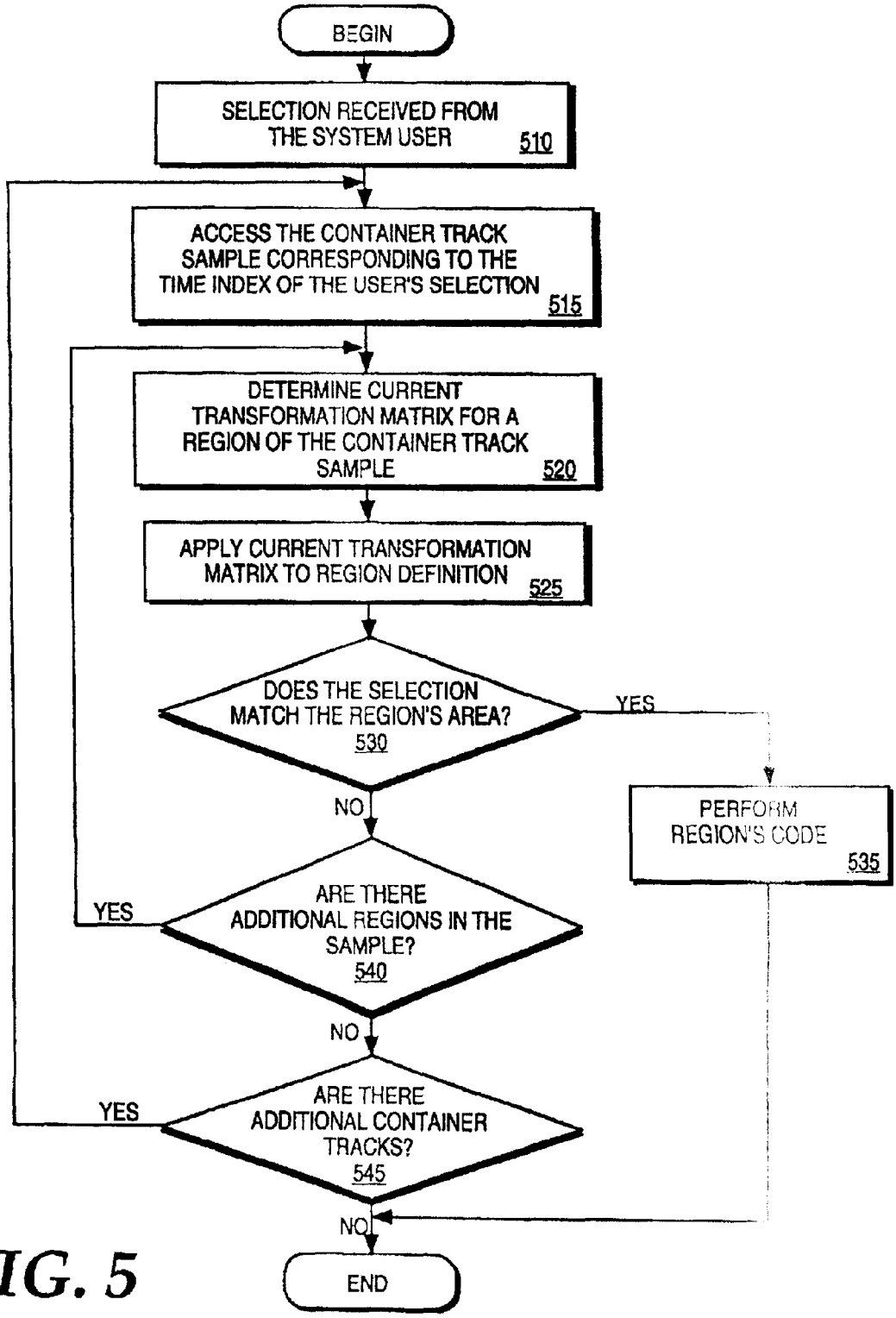
FIG. 5 is a flowchart showing the steps followed to identify a user-selectable region according to one embodiment of the present invention.

FIG. 5 is a flowchart showing the steps followed to identify a user-selectable region according to one embodiment of the present invention. A selection is first received from the system user, step 510. As discussed above, a selection may result from the depressing and release of a mouse button or by simply moving a display pointer over the selectable region.

The user may make a selection at any time during the display of the media sequence. Once the selection is made, the present invention accesses the container track sample corresponding to the time index of the user's selection, step 515. The time index of a user's selection is the time of the movie clock when the selection is made. Once the container track sample is determined, the present invention determines the current transformation matrix for the selected frame, step 520. The steps followed in determining the current transformation matrix are discussed in more detail below with reference to FIG. 6.

Once the current transformation matrix is determined, the present invention applies the current transformation matrix to the region definition, step 525. This region definition is contained in either the preceding key sample or an override sample. The region definition used is based on the merged sample, which is generated as discussed below with reference to FIG. 7. The present invention then checks whether the user's selection matches the area the region occupies at the time of the selection, step 530. If the user's selection matches the area the region occupies, then the region's code for the system event which constituted selection (e.g., clicking a mouse button or moving the cursor over the region) is performed, step 535. Performance of the code, as described above, may include any of a wide variety of actions, such as displaying additional text on the screen (for example, sale information for a sofa), or playing a movie.

In an alternate embodiment of the present invention, rather than performing the region's code in step 535 and ending the process, the present invention continues to check the user's selection against region locations in the container track(s). Thus, multiple matches between the user's selection and region locations may be registered in this embodiment (e.g., due to the regions being in different layers). The present invention can then perform the code for all of the regions or only select regions (e.g., the highest layer, lowest layer, middle layer, etc.).

If the selection does not match the area the region occupies in step 530, then the present invention determines whether there are any additional regions in the sample, step 540. If there are additional regions in the sample, then steps 520–540 are repeated to determine whether the user's selection matches one of the additional regions.

However, if there are not additional regions in the sample, then the present invention determines whether any additional container tracks exist in the movie, step 545. If additional container tracks exist, then steps 515 through 540 are repeated for those additional tracks to determine whether a user-selectable region defined within one of those tracks matches the user's selection.

In one embodiment of the present invention a selection is made by moving a display pointer over a selectable region, as discussed above. In this embodiment, steps 510–545 are repeated each time the display pointer is moved on the screen to determine whether a user-selectable region has been selected.

Figure 6:
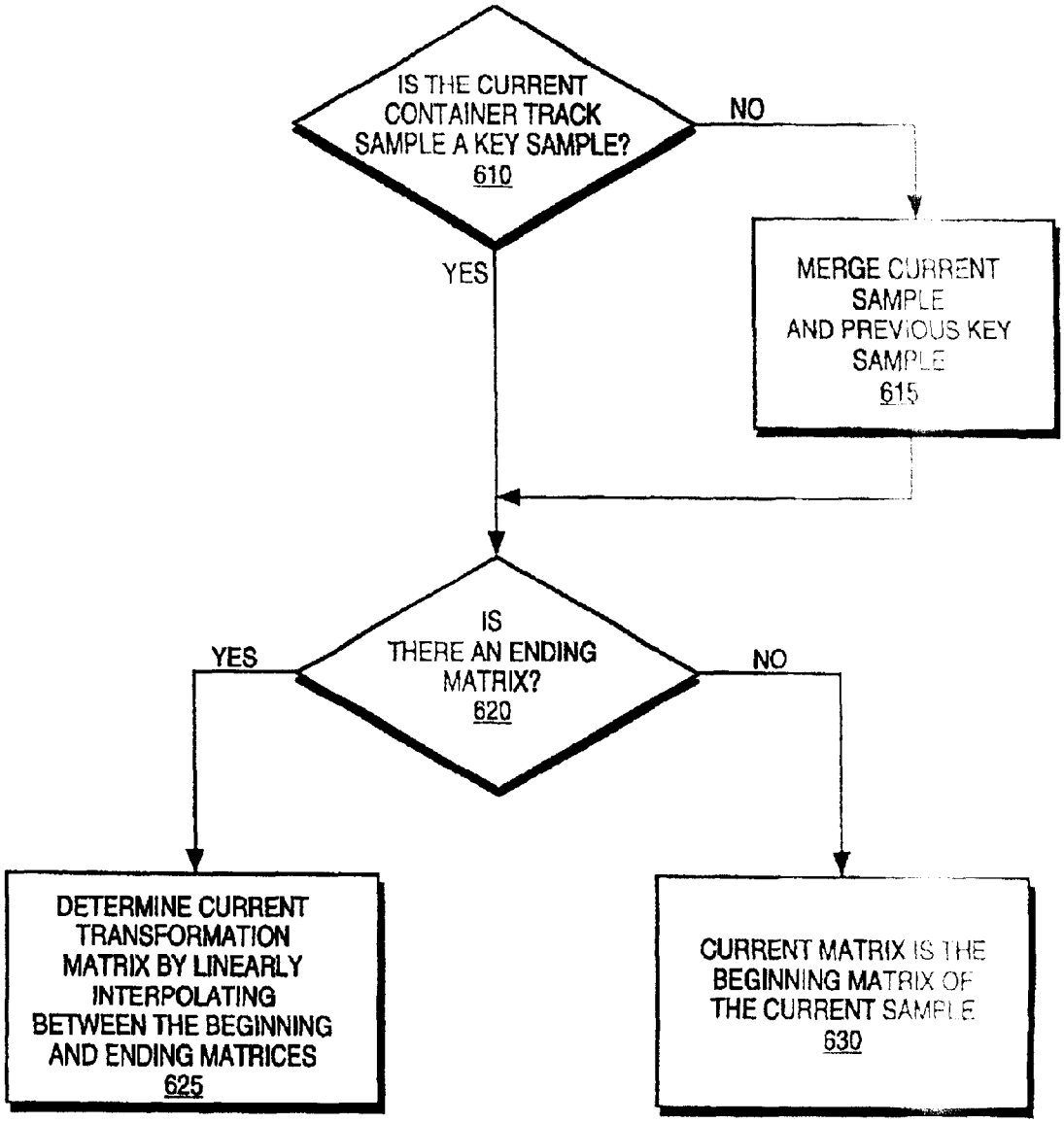
FIG. 6 shows the steps followed in determining the current transformation matrix for a sample according to one embodiment of the present invention.

FIG. 6 shows the steps followed in determining the current transformation matrix for a sample, corresponding to step 520 of FIG. 5, according to one embodiment of the present invention. The present invention first checks whether the current sample is a key sample, step 610. In one implementation, this check is made by accessing a key sample table, as discussed above. If the sample is not a key sample, then the current sample and the preceding key sample are merged, step 615. The merging process generates a merged sample, as discussed in more detail below.

The present invention then checks whether the current sample (or the merged sample if samples were merged in step 615) contains an ending transformation matrix, step 620. If there is no ending transformation matrix, then the current matrix is the beginning matrix of the current (or merged) sample, step 630. However, if there is an ending transformation matrix, then the current matrix is the interpolation transformation matrix generated by interpolating between the beginning transformation matrix and the ending transformation matrix of the current (or merged) sample, step 625.

Figure 7:
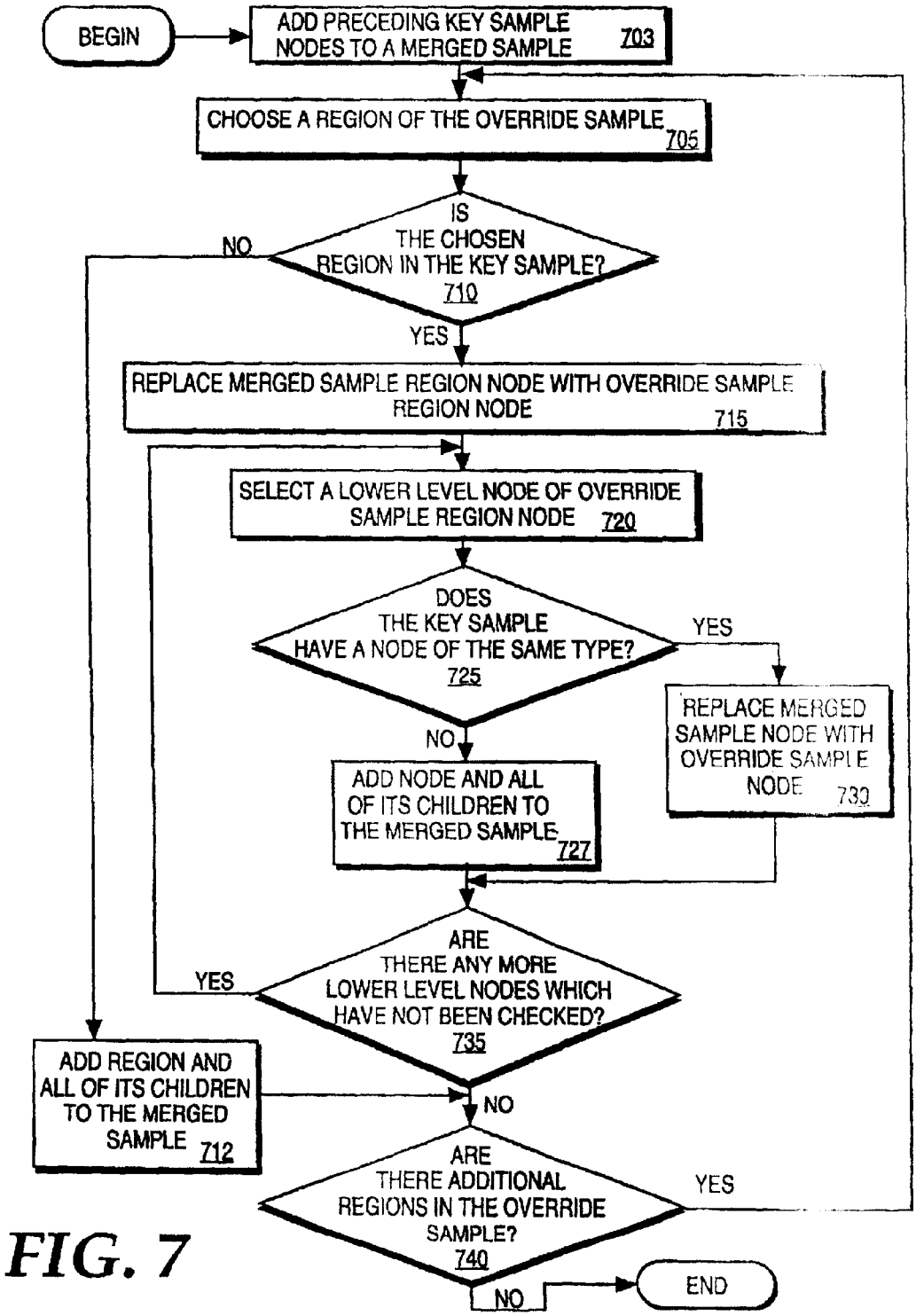
FIG. 7 shows the steps followed in merging multiple samples according to one embodiment of the present invention.

FIG. 7 shows the steps followed in merging multiple samples according to one embodiment of the present invention. In one implementation, FIG. 7 shows the steps followed in step 615 of FIG. 6. When multiple samples are merged together, the nodes in subsequent samples replace corresponding nodes in previous samples to generate a merged sample which represents the container track information corresponding to the time of the merging. The process starts by adding all of the nodes from the preceding key sample to a merged sample, step 703, then choosing a region of the override sample, step 705. The present invention then checks whether the region chosen in step 705 is in the previous key sample, step 710. If the region is not in the previous key sample, then the region and all of its children (if any) are added to the merged sample, step 712. The present invention then checks whether there are any additional regions in the override sample, step 740. If so, then the present invention returns to step 705 to choose another region.

Returning to step 710, if the chosen region is in the previous key sample, then the present invention replaces the corresponding region in the merged sample with the override sample region, step 715. This can be shown by way of example referring to FIGS. 3A and 3B. Key sample 320 contains user-selectable region 322 which is overridden by region node 372 of override sample 370. Thus, the merged sample contains region node 372 rather than region node 322.

The present invention then selects a lower level node (that is, one of the children) of the chosen override sample region node, step 720. A lower level node refers to any node in the tree of the key sample which is a child, grandchild, great-grandchild, etc. of the region node. In one implementation, lower level nodes are selected in a depth-first manner. That is, a child is selected, then all of its children are selected, then all of its children's children are selected, etc. In an alternate implementation, lower level nodes are selected in a breadth-first manner. That is, a child is selected from the children of the region node until no such children remain, then a child is selected from the grandchildren level, etc.

Once a lower level node is selected, the present invention checks whether the key sample has a node of the same type, step 725. If there are no nodes of the same type in the key sample, then the present invention adds the node and all of its children to the merged sample, step 727. The present invention then checks whether there are any more lower level nodes which have not been selected yet (or added to the merged sample), step 735. For example, in FIG. 3A, override sample 370 contains code node 374 as a child of region node 372. Thus, code node 330 of key sample 320 is replaced by code node 374 of override sample 370. However, no other nodes of the same type exist in override sample 370 for region definition node 324, beginning transformation matrix 326, ending transformation matrix 328, or layer indicator 336.

However, if the override sample has a node of the same type, then the corresponding node in the merged sample is replaced by the node in the override sample, step 730. That is, the override sample node is added to the merged sample rather than the key sample node. The present invention then checks whether there are any more lower level nodes which have not been selected (or added to the merged sample), step 735. If any unselected nodes exist, then steps 720 through 735 are repeated until all such nodes have been selected. Thus, steps 715 through 735 result in generation of a merged sample which is the original key sample with any nodes replaced by those which are contained in the override sample.

The present invention then checks whether there are any additional regions in the previous key sample which have not been checked. If there are additional regions, then steps 705 through 735 are repeated for these additional regions. Thus, the merge process as shown in FIG. 7 results in a merged sample which contains all regions of the preceding key sample as modified by the override sample.

FIG. 7 as discussed above shows the steps followed to merge a key sample with an override sample. It is to be appreciated, however, that analogous steps are performed to merge multiple override samples with a key sample. In one embodiment, this is accomplished by the present invention checking for the most recent override sample which has a node of the same type in step 725. In this embodiment, the node of an override sample that corresponds to a preceding key sample node replaces that key sample node. However, if multiple override samples exist which have nodes that correspond to a preceding key sample node, then the most recent override sample node replaces the key sample node.

Thus, the present invention allows user-selectable regions within multiple display frames to be identified. The definitions for these user-selectable regions are stored in a memory-efficient manner, which can include using override samples to modify key samples and using multiple transformation matrices to identify movement of a user-selectable region.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for identifying user-selectable regions within multiple display frames has been described.

What is claimed is:

1. An article comprising:

a storage medium; and the storage medium having stored thereon a container track having a plurality of samples that include, a key sample that includes information to initially define a user-selectable region of a corresponding track, wherein the region is selectable by a user during playback of the corresponding track and such selection does not modify the corresponding track, and an override sample that includes information to modify the region definition of the key sample.

2. The article of claim 1, wherein the information of the key sample includes one or more of a region definition that provides an outline of the user-selectable region, a beginning transformation function that maps the region definition to a first location of a display at a first time, an ending transformation function that maps the region definition to a second location of the display at a second time subsequent to the first time, a code indicator that identifies an action to be performed if the region is selected, and a layer indicator that identifies the depth of the region relative to other user-selectable regions being displayed.

3. The article of claim 2, wherein the information of the key sample includes each of the region definition, the beginning transformation function, the ending transformation function, the code indicator, and the layer indicator.

4. The article of claim 1, wherein the information of the override sample includes one or more of a region definition that provides an outline of the user-selectable region, a beginning transformation function that maps the region definition to a first location of a display at a first time, an ending transformation function that maps the region definition to a second location of the display at a second time subsequent to the first time, a code indicator that identifies an action to be performed if the region is selected, and a layer indicator that identifies the depth of the region relative to other user-selectable regions being displayed.

5. The article of claim 4, wherein the information of the override sample includes each of the region definition, the beginning transformation function, the ending transformation function, the code indicator, and the layer indicator.

6. The article of claim 1, wherein the information in the override sample replaces at least a portion of the information in the key sample.

7. The article of claim 1, wherein the information in the override sample augments the information in the key sample.

8. The article of claim 1, wherein the storage medium also has stored thereon the corresponding track.

9. The article of claim 1, wherein the corresponding track comprises a video track.

10. The article of claim 1, wherein the storage medium also has stored thereon a key sample table to determine, for each of the plurality of samples, whether the sample is a key sample or an override sample.

11. The article of claim 1, wherein the container track further includes a second sample of the plurality of samples that includes information to define a second user-selectable region based at least in part on the information from at least one of the key sample and the override sample.

12. A method comprising:

receiving an indication of a user selection;

determining whether information for a user-selectable region is based on a key sample alone or the key sample in combination with an override sample;

merging information from the key sample with information from the override sample to determine a region definition and a current transformation function if the information for the user-selectable region is based on the key sample in combination with the override sample, otherwise using the information from the key sample alone to determine the region definition and the current transformation function; and determining a location of the user-selectable region at a time the user selection is made based at least in part on the region definition and the current transformation function.

13. The method of claim 12, further comprising:

comparing a location on a display of the user selection with the location of the user-selectable region at the time the user selection is made; and determining whether the user selection is a selection of the user-selectable region based on the comparing.

14. The method of claim 12, wherein the merging further comprises interpolating between a beginning transformation function and an ending transformation function to determine the current transformation function.

15. The method of claim 14, wherein the beginning transformation function is stored in the key sample and the ending transformation function is stored in the override sample.

16. The method of claim 14, wherein both the beginning transformation function and the ending transformation function are stored in the override sample.

17. The method of claim 12, further comprising determining, based on both the key sample and the override sample, an action to be taken in response to the user selection if the information for the user-selectable region is based on the key sample in combination with the override sample, otherwise determining, based on the key sample alone, the action to be taken in response to the user selection.

18. A machine-readable medium having stored thereon a series of instructions which, when executed by a processor, cause the processor to:

receive an indication of a user selection;

determine whether information for a user-selectable region is based on a key sample alone or the key sample in combination with an override sample;

merge information from the key sample with information from the override sample to determine a region definition and a current transformation function if the information for the user-selectable region is based on the key sample in combination with the override sample, and otherwise use the information from the key sample alone to determine the region definition and the current transformation function; and determine a location of the user-selectable region at a time the user selection is made based at least in part on the region definition and the current transformation function.

19. The machine-readable medium of claim 18, wherein the series of instructions further cause the processor to:

compare a location on a display of the user selection with the location of the user-selectable region at the time the user selection is made; and determine whether the user selection is a selection of the user-selectable region based on the comparing.

20. The machine-readable medium of claim 18, wherein the instructions that cause the processor to merge information from the key sample with information from the override sample further comprise instructions that cause the processor to interpolate between a beginning transformation function and an ending transformation function to determine the current transformation function.

21. The machine-readable medium of claim 20, wherein the beginning transformation function is stored in the key sample and the ending transformation function is stored in the override sample.

22. The machine-readable medium of claim 20, wherein both the beginning transformation function and the ending transformation function are stored in the override sample.

23. The machine-readable medium of claim 18, wherein the series of instructions further cause the processor to determine, based on both the key sample and the override sample, an action to be taken in response to the user selection if the information for the user-selectable region is based on the key sample in combination with the override sample, and otherwise determine, based on the key sample alone, the action to be taken in response to the user selection.

[24. An apparatus comprising:

logic embodied in computer program code on a computer-readable medium to receive an indication of a user selection;

logic embodied in computer program code on the computer-readable medium to determine whether information for a user-selectable region is based on a key sample alone or the key sample in combination with an override sample;

logic embodied in computer program code on the computer-readable medium to merge information from the key sample with information from the override sample to determine a region definition and a current transformation function if the information for the user-selectable region is based on the key sample in combination with the override sample, and otherwise to use the information from the key sample alone to determine the region definition and the current transformation function; and logic embodied in computer program code on the computer-readable medium to determine a location of the user-selectable region at a time the user selection is made based at least in part on the region definition and the current transformation function.]

[25. The apparatus of claim 24, further comprising logic embodied in computer program code on the computer-readable medium to determine, based on both the key sample and the override sample, an action to be taken in response to the user selection if the information for the user-selectable region is based on the key sample in combination with the override sample, and otherwise to determine, based on the key sample alone, the action to be taken in response to the user selection.]

26. [An apparatus comprising] *A computer program product for determining a location of a user-selectable region, the computer program product having a computer-readable storage medium having computer executable code for*:

[first logic embodied in computer program code on a computer-readable medium for] receiving an indication of a user selection and determining whether information for a user-selectable region is based on a key sample alone or the key sample in combination with an override sample;

[second logic embodied in computer program code on the computer-readable medium for] merging information from the key sample with information from the override sample to determine a region definition and a current transformation function if the information for the user-selectable region is based on the key sample in combination with the override sample, and otherwise [for] using the information from the key sample alone to determine the region definition and the current transformation function; and

[third logic embodied in computer program code on the computer-readable medium for] determining a location of the user-selectable region at a time the user selection is made based at least in part on the region definition and the current transformation function.

27. The [apparatus] *computer program product* of claim 26 [wherein the third logic is further for] *further comprising executable code for* determining, based on both the key sample and the override sample, an action to be taken in response to the user selection if the information for the user-selectable region is based on the key sample in combination with the override sample, and otherwise [for] determining, based on the key sample alone, the action to be taken in response to the user selection.

28. [An apparatus] *A computer program product having a computer-readable storage medium having computer executable code for determining a location of a user-selectable region,* comprising:

means for receiving an indication of a user selection;

means for determining whether information for a user-selectable region is based on a key sample alone or the key sample in combination with an override sample;

means for merging information from the key sample with information from the override sample to determine a region definition and a current transformation function if the information for the user-selectable region is based on the key sample in combination with the override sample, otherwise using the information from the key sample alone to determine the region definition and the current transformation function; and means for determining a location of the user-selectable region at a time the user selection is made based at least in part on the region definition and the current transformation function.

29. The [apparatus] *computer program product* of claim 28, further comprising:

means for comparing a location on a display of the user selection with the location of the user-selectable region at the time the user selection is made; and means for determining whether the user selection is a selection of the user-selectable region based on the comparing.

30. The [apparatus] *computer program product* of claim 28, wherein the means for merging comprises means for interpolating between a beginning transformation function and an ending transformation function to determine the current transformation function.

31. The [apparatus] *computer program product* of claim 28, further comprising means for determining, based on both the key sample and the override sample, an action to be taken in response to the user selection if the information for the user-selectable region is based on the key sample in combination with the override sample, otherwise determining, based on the key sample alone, the action to be taken in response to the user selection.

*32. An apparatus comprising:*

*a storage device including a video track comprising a plurality of frames, wherein a first frame of the video track corresponds to a user-selectable region; and*

*a processing unit coupled to the storage device which determines an area occupied by the user-selectable region at an intermediate point in time based on interpolation between a first matrix of a key sample representing the user-selectable region at a first point in time and a second matrix of an override sample representing the user-selectable region at a second point in time, and which outputs a signal indicating whether a user selection falls within the determined area.*

*33. The apparatus of claim 32, wherein the storage device also includes a container track corresponding to the video track, wherein the container track includes a plurality of samples corresponding to the video track.*

*34. The apparatus of claim 33, wherein each sample of the plurality of samples corresponds to a single frame of the plurality of frames of the video track.*

*35. The apparatus of claim 32, wherein the key sample corresponds to the first frame of the video track and the override sample corresponds to a second frame of the video track.*

*36. The apparatus of claim 32, wherein the processing unit utilizes linear interpolation to determine the area occupied by the user-selectable region.*

*37. An apparatus for identifying a user-selectable region within a series of display frames, the apparatus comprising:*

*a storage device, for storing a container track sample corresponding to an input, a region definition for the container track sample, and a beginning transformation function for the container track sample; and*

*a processing unit, coupled to the storage device, for:*

*comparing a time index to a key sample table to determine whether the container track sample is a key sample or an override sample;*

*identifying the user-selectable region by applying the beginning transformation function to the region definition;*

*outputting a signal indicating the location of the user-selectable region; and*

*executing a set of instructions identified in the container track sample.*

*38. The apparatus of claim 37, wherein the beginning transformation function comprises a beginning matrix.*

*39. The apparatus of claim 37, wherein the input is user-actuated.*

*40. The apparatus of claim 37, wherein the region definition and the beginning transformation function are contained in a previous container track sample.*

*41. The apparatus of claim 37, wherein the storage device further comprises an ending transformation function for the container track sample and wherein the processing unit further:*

*generates an interpolated transformation function by interpolating between the beginning transformation function and the ending transformation function; and*

*indicates the user-selectable region by applying the interpolated transformation function to the region definition.*

*42. The apparatus of claim 37, wherein the processing unit identifies the user-selectable region by multiplying each point of the region definition by the beginning transformation function.*

*43. A computer-implemented method comprising the steps of:*

*accessing a first frame of a video track stored on a storage device, wherein the video track includes a plurality of frames and wherein the first frame corresponds to a user-selectable region;*

*determining an area occupied by the user-selectable region at an intermediate point in time based on interpolation between a first matrix of a key sample representing the user-selectable region at a first point in time and a second matrix of an override sample representing the user-selectable region at a second point in time; and*

*outputting a signal indicating whether a user selection falls within the determined area.*

*44. The computer-implemented method of claim 43, further comprising the step of obtaining the first matrix and the second matrix by accessing a container track, stored on the storage device, corresponding to the video track, wherein the container track includes a plurality of samples corresponding to the video track.*

*45. The computer-implemented method of claim 44, wherein each sample of the plurality of samples corresponds to a single frame of the plurality of frames of the video track.*

*46. The computer-implemented method of claim 43, wherein the key sample corresponds to the first frame of the video track and the override sample corresponds to a second frame of the video track.*

*47. The computer-implemented method of claim 43, wherein the determining step comprises the step of using linear interpolation to determine the area occupied by the user-selectable region.*

*48. A computer-readable medium having stored thereon a plurality of instructions, designed to be executed by a processor, for implementing a function to access a first frame of a video track stored on a storage device, wherein the video track includes a plurality of frames and wherein the first frame corresponds to a user-selectable region, a function to determine an area occupied by the user-selectable region at an intermediate point in time based on interpolation between a first matrix of a key sample representing the user-selectable region at a first point in time and a second matrix of an override sample representing the user-selectable region at a second point in time, and a function to output a signal indicating whether a user selection falls within the determined area.*

*49. A computer-readable medium of claim 48, further comprising a plurality of instructions for implementing a function to obtain the first matrix and the second matrix by accessing a container track, stored on the storage device, corresponding to the video track, wherein the container track includes a plurality of samples corresponding to the video track.*

*50. The computer-readable medium of claim 49, wherein each sample of the plurality of samples corresponds to a single frame of the plurality of frames of the video track.*

*51. The computer-readable medium of claim 48, wherein the key sample corresponds to the first frame of the video track and the override sample corresponds to a second frame of the video track.*

*52. The computer-readable medium of claim 48, wherein the plurality of instructions for implementing a function to determine the area occupied by the user-selectable region at the first point in time comprises a plurality of instructions for implementing a function to determine the area occupied by the user-selectable region at the first point in time using linear interpolation.*

*53. An apparatus comprising:*

*an input device, for receiving an indication of a user selection;*

*a region determination module, coupled to the input device, for:*

*determining whether information for a user-selectable region is based on a key sample alone or the key sample in combination with an override sample;*

*merging information from the key sample with information from the override sample to determine a region definition and a current transformation function if the information for the user-selectable region is based on the key sample in combination with the override sample otherwise using the information from the key sample alone to determine the region definition and the current transformation function;*

*determining a location of the user-selectable region at a time the user selection is made based at least in part on the region definition and the current transformation function; and*

*outputting a signal indicating whether the user selection falls within the user-selectable region.*

*54. The apparatus of claim 53, further comprising:*

*a comparator, coupled to the region determination module, for:*

*comparing a location on a display of the user selection with the location of the user-selectable region at the time the user selection is made; and*

*determining whether the user selection is a selection of the user-selectable region based on the comparing.*

*55. The apparatus of claim 53, wherein the region determination module further interpolates between a beginning transformation function and an ending transformation function to determine the current transformation function.*

*56. The apparatus of claim 55, wherein the beginning transformation function is stored in the key sample and the ending transformation function is stored in the override sample.*

*57. The apparatus of claim 55, wherein both the beginning transformation function and the ending transformation function are stored in the override sample.*

*58. The apparatus of claim 53, further comprising an action determination module, coupled to the region determination module, for determining, based on both the key sample and the override sample, an action to be taken in response to the user selection if the information for the user-selectable region is based on the key sample in combination with the override sample, otherwise determining, based on the key sample alone, the action to be taken in response to the user selection.*

*59. An apparatus comprising:*

*a storage device including a video track comprising a plurality of frames, wherein a first frame of the video track corresponds to a user selectable region; and*

*a processing unit coupled to the storage device which determines an area occupied by the user-selectable region at an intermediate point in time, the area occupied by the user selectable region including at least one location in the first frame, based on interpolation between a key sample representing the user-selectable region at a first point in time and an override sample representing the user-selectable region at a second point in time, and which outputs a signal indicating whether a user selection falls within the determined area.*

*60. The apparatus of claim 59, wherein the storage device also includes a container track corresponding to the video track, wherein the container track includes a plurality of samples corresponding to the video track.*

*61. The apparatus of claim 60, wherein each sample of the plurality of samples corresponds to a single frame of the plurality of frames of the video track.*

*62. The apparatus of claim 59, wherein the key sample corresponds to the first frame of the video track and the override sample corresponds to a second frame of the video track.*

*63. The apparatus of claim 59, wherein the processing unit utilizes linear interpolation to determine the area occupied by the user-selectable region.*

*64. A computer-implemented method comprising the steps of:*

*accessing a first frame of a video track stored on a storage device, wherein the video track includes a plurality of frames and wherein the first frame corresponds to a user-selectable region;*

*determining an area occupied by the user-selectable region at an intermediate point in time, the area occu-*

*pied by the user selectable region including at least one location in the first frame, based on interpolation between a key sample representing the user-selectable region at a first point in time and an override sample representing the user-selectable region at a second point in time; and*

*outputting a signal indicating whether a user selection falls within the determined area.*

*65. The computer-implemented method of claim 64, further comprising the step of obtaining the samples by accessing a container track, stored on the storage device, corresponding to the video track, wherein the container track includes a plurality of samples corresponding to the video track.*

*66. The computer-implemented method of claim 64, wherein the key sample corresponds to the first frame of the video track and the override sample corresponds to a second frame of the video track.*

*67. The computer-implemented method of claim 64, wherein the determining step comprises the step of using linear interpolation to determine the area occupied by the user-selectable region.*

*68. A computer-readable medium having stored thereon a plurality of instructions, designed to be executed by a processor, for implementing a function to access a first frame of a video track stored on a storage device, wherein the video track includes a plurality of frames and wherein the first frame corresponds to a user-selectable region, a function to determine an area occupied by the user-selectable region at an intermediate point in time, the area occupied by the user selectable region including at least one location in the first frame, based on interpolation between a key sample representing the user selectable region at a first point in time and an override sample representing the user-selectable region at a second point in time, and a function to output a signal indicating whether a user selection falls within the determined area.*

*69. The computer-readable medium of claim 68, further comprising a plurality of instructions for implementing a function to obtain the first matrix and the second matrix by accessing a container track, stored on the storage device, corresponding to the video track, wherein the container track includes a plurality of samples corresponding to the video track.*

*70. The computer-readable medium of claim 68, wherein each sample of the plurality of samples corresponds to a single frame of the plurality of frames of the video track.*

*71. The computer-readable medium of claim 68, wherein the key sample corresponds to the first frame of the video track and the override sample corresponds to a second frame of the video track.*

*72. The computer-readable medium of claim 68, wherein the plurality of instructions for implementing a function to determine the area occupied by the user-selectable region at the first point in time comprises a plurality of instruction is for implementing a function to determine the area occupied by the user-selectable region at the first point in time using linear interpolation.*

*73. A method comprising:*

*receiving an indication of a user selection;*

*determining whether information for a user-selectable region is based on a first sample alone or the first sample in combination with a second sample, the first and second samples having a relationship so that combining information from the first and second samples produces a valid result;*

*merging information from the first sample with information from the second sample to determine a region definition if the information for the user-selectable region is based on the first sample in combination with the second sample, and otherwise using the information from the first sample alone to determine the region definition, the region definition defining at least one spatial location;*

*determining a spatial location of the user-selectable region at a time the user selection is made based at least in part on the region definition; and*

*outputting a signal indicating whether the user selection fails within the user-selectable region.*

*74. The method of claim 73, further comprising:*

*comparing a location on a display of the user selection with the spatial location of the user-selectable region at the time the user selection is made; and*

*determining whether the user selection is a selection of the user-selectable region based on the comparing.*

*75. The method of claim 73, wherein the merging further comprises interpolating between information from the first sample and information from the second sample to determine the region definition.*

*76. The method of claim 73, further comprising determining, based on both samples, an action to be taken in response to the user selecting if the information for the user-selectable region is based on both samples, and otherwise determining, based on one sample alone, the action to be taken in response to the user selection.*

*77. A machine-readable medium having stored thereon a series of instructions which, when executed by a processor, cause the processor to:*

*receive an indication of a user selection;*

*determine whether information for a user-selectable region is based on a first sample alone or the first sample in combination with a second sample;*

*merge information from the first sample with information from the second sample to determine a region definition if the information for the user-selectable region is based on the first sample in combination with the second sample, otherwise use the information from the first sample alone to determine the region definition, the region definition defining at least one spatial location;*

*determine a spatial location of the user-selectable region at a time the user selection is made based at least in part on the region definition; and*

*output a signal indicating whether the user selection falls within the user-selectable region.*

*78. The machine-readable medium of claim 77, wherein the series of instructions further cause the processor to:*

*compare a location on a display of the user selection with the spatial location of the user-selectable region at the time the user selection is made; and*

*determine whether the user selection is a selection of the user selectable region based on the comparing.*

*79. The machine-readable medium of claim 77, wherein the instructions that cause the processor to merge information from the first sample with information from the second sample further comprise instructions that cause the processor to interpolate between information from the first sample and information from the second sample to determine the region definition.*

*80. The machine-readable medium of claim 77, wherein the series of instructions further cause the processor to determine, based on both samples, an action to be taken in response to the user selection if the information for the user selectable region is based on both samples, and otherwise*

*determine, based on one sample alone, the action to be taken in response to the user selection.*

*81. A computer program product comprising a computer-usable medium storing computer-readable code therein for identifying a user-selectable region comprising:*

*computer-readable program code configured to cause a computer to receive an indication of a user selection;*

*computer-readable program code configured to cause a computer to determine whether information for a user-selectable region is based on a first sample alone or the first sample in combination with a second sample;*

*computer-readable program code configured to cause a computer to merge information from the first sample with information from the second sample to determine a region definition if the information for the user-selectable region is based on the first sample in combination with the second sample, and otherwise to use the information from the first sample alone to determine the region definition, the region definition defining at least one spatial location;*

*computer-readable program code configured to cause a computer to determine a spatial location of the user-selectable region at a time the user selection is made based at least in part on the region definition; and*

*computer-readable program code configured to cause a computer to output a signal indicating whether the user selection falls within the user-selectable region.*

*82. The computer program product of claim 81, further comprising computer-readable program code configured to cause a computer to determine, based on both samples, an action to be taken in response to the user selection if the information for the user-selectable region is based on both samples, and otherwise to determine based on one sample alone, the action to be taken in response to the user selection.*

*83. A computer program product for determining a location of user-selectable region, the computer program product having a computer-readable storage medium having computer executable code for:*

*receiving an indication of a user selection;*

*determining whether information for a user-selectable region is based on a first sample alone or the first sample in combination with a second sample;*

*merging information from the first sample with information from the second sample to determine a region definition if the information for the user-selectable region is based on the first sample in combination with the second sample, and otherwise using the information from the first sample alone to determine the region definition, the region definition defining at least one spatial location;*

*determining a spatial location of the user-selectable region at a time the user selection is made based at least in part on the region definition; and*

*outputting a signal indicating whether the user selection falls within the user-selectable region.*

*84. The computer program product of claim 83 further comprising computer executable code for:*

*comparing a location on a display of the user selection with the spatial location of the user-selectable region at the time the user selection is made; and*

*determining whether the user selection is a selection of the user-selectable region based on the comparing.*

*85. The computer program product of claim 83 wherein the computer executable code for merging comprises computer executable code for interpolating between information from the first sample and information from the second sample to determine the region definition.*

*86. The computer program product of claim 83, further comprising computer executable code for determining, based on both samples, an action to be taken in response to the user selection if the information for the user-selectable region is based on both samples, and otherwise determining, based on one sample alone, the action to be taken in response to the user selection.*

*87. An apparatus comprising:*

*an input device, for receiving an indication of a user selection;*

*a region determination module, coupled to the input device, for:*

*determining whether information for a user-selectable region is based on a first sample alone or the first sample in combination with a second sample, the first and second samples having a relationship so that combining information from the first and second samples produces a valid result;*

*merging information from the first sample with information from the second sample to determine a region definition if the information for the user-selectable region is based on the first sample in combination with the second sample, and otherwise using the information from the first sample alone to determine the region definition, the region definition defining at least one spatial location;*

*determining a spatial location of the user-selectable region at a time the user selection is made based at least in part on the region definition; and*

*outputting a signal indicating whether the user selection falls within the user-selectable region.*

*88. The apparatus of claim 87, further comprising:*

*a comparator, coupled to the region determination module, for:*

*comparing a location on a display of the user selection with the spatial location of the user-selectable region at the time the user selection is made; and*

*determining whether the user selection is a selection of the user-selectable region based on the comparing.*

*89. The apparatus of claim 87, wherein the region determination module further interpolates between information from the first sample and information from the second sample to determine the region definition.*

*90. The apparatus of claim 87, further comprising an action determination module, coupled to the region determination module, for determining, based on both samples, an action to be taken in response to the user selection if the information for the user-selectable region is based on both samples, and otherwise determining based on one sample alone, the action to be taken in response to the user selection.*

*91. An apparatus comprising:*

*a storage device including a video track comprising a plurality of frames, wherein a first frame of the video track corresponds to a user selectable region; and*

*a processing unit coupled to the storage device which determines an area occupied by the user-selectable region based on a combination of a key sample representing the user-selectable region at a first point in time and an override sample representing the user-selectable region at a second point in time, the area occupied by the user-selectable region including at*

*least one location in the first frame, and which outputs a signal indicating whether a user selection falls within the determined area.*

*92. The apparatus of claim 91, wherein the storage device also includes a container track corresponding to the video track, wherein the container track includes a plurality of samples corresponding to the video track.*

*93. The apparatus of claim 91, wherein each sample of the plurality of samples corresponds to a single frame of the plurality of frames of the video track.*

*94. The apparatus of claim 91, wherein the key sample corresponds to the first frame of the video track and the override sample corresponds to a second frame of the video track.*

*95. A computer-implemented method comprising the steps of:*

*accessing a first frame of a video track stored on a storage device, wherein the video track includes a plurality of frames and wherein the first frame corresponds to a user-selectable region;*

*determining an area occupied by the user-selectable region at a point in time based on a combination of a key sample representing the user-selectable region at a first point in time and an override sample representing the user-selectable region at a second point in time, the area occupied by the user-selectable region including at least one location in the first frame; and*

*outputting a signal indicating whether a user selection falls within the determined area.*

*96. The computer-implemented method of claim 95, further comprising the step of obtaining the samples by accessing a container track, stored on the storage device, corresponding to the video track, wherein the container track includes a plurality of samples corresponding to the video track.*

*97. The computer-implemented method of claim 95, wherein the key sample corresponds to the first frame of the video track and the override sample corresponds to a second frame of the video track.*

*98. A computer-readable medium having stored thereon a plurality of instructions, designed to be executed by a processor, for implementing a function to access a first frame of a video track stored on a storage device, wherein the video track includes a plurality of frames and wherein the first frame corresponds to a user-selectable region, a function to determine an area occupied by the user-selectable region at a point in time based on a combination of a key sample representing the user-selectable region at a first point in time and an override sample representing the user-selectable region at a second point in time, the area occupied by the user-selectable region including at least one location in the first frame, and a function to output a signal indicating whether a user selection falls within the determined area.*

*99. The computer-readable medium of claim 98, wherein each sample of the plurality of samples corresponds to a single frame of the plurality of frames of the video track.*

*100. The computer-readable medium of claim 98, wherein the key sample corresponds to the first frame of the video track and the override sample corresponds to a second frame of the video track.*

*101. The computer-readable medium of claim 98, wherein the plurality of instructions for implementing a function to determine the area occupied by the user-selectable region at the first point in time comprises a plurality of instructions for implementing a function to determine the area occupied by the user-selectable region at the first point in time using linear interpolation.*

*102. A method comprising:*

*receiving an indication of a user selection;*

*determining whether information for a user-selectable region is based on a key sample alone or the key sample in combination with an override sample;*

*merging information from the key sample with information from the override sample to determine a region definition if the information for the user-selectable region is based on the key sample in combination with the override sample, otherwise using the information from the key sample alone to determine the region definition, the region definition defining at least one spatial location; and*

*determining a spatial location of the user-selectable region at a time the user selection is made based at least in part on the region definition; and*

*outputting a signal indicating whether the user selection falls within the user-selectable region.*

*103. The method of claim 102, further comprising:*

*comparing a location on a display of the user selection with the spatial location of the user-selectable region at the time the user selection is made; and*

*determining whether the user selection is a selection of the user-selectable region based on the comparing.*

*104. The method of claim 102, wherein the merging further comprises interpolating between information from the key sample and information from the override sample to determine the region definition.*

*105. The method of claim 102, further comprising determining, based on both samples, an action to be taken in response to the user selection if the information for the user-selectable region is based on the key sample in combination with the override sample, otherwise determining, based on the key sample alone, the action to be taken in response to the user selection.*

*106. A machine-readable medium having stored thereon a series of instructions which, when executed by a processor, cause the processor to:*

*receive an indication of a user selection;*

*determine whether information for a user-selectable region is based on a key sample alone or the key sample in combination with an override sample;*

*merge information from the key sample with information from the override sample to determine a region definition if the information for the user-selectable region is based on the key sample in combination with the override sample, and otherwise use the information from the key sample alone to determine the region definition, the region definition defining at least one spatial location;*

*determine a spatial location of the user-selectable region at a time the user selection is made based at least in part on the region definition; and*

*output a signal indicating whether the user selection falls within the user-selectable region.*

*107. The machine-readable medium of claim 106, wherein the series of instructions further cause the processor to:*

*compare a location on a display of the user selection with the spatial location of the user-selectable region at the time the user selection is made; and*

*determine whether the user selection is a selection of the user-selectable region based on the comparing.*

*108. The machine-readable medium of claim 106, wherein the information from the first sample comprises a beginning transformation function stored in the first sample and the*

*information from the second sample comprises an ending transformation function stored in the second sample.*

*109. The machine-readable medium of claim 106, wherein the series of instructions further cause the processor to determine, based on both samples, an action to be taken in response to the user selection if the information for the user-selectable region is based on the key sample in combination with the override sample, and otherwise determine, based on the key sample alone, the action to be taken in response to the user selection.*

*110. A computer program product comprising a computer-usable medium storing computer-readable code therein for identifying a user-selectable region comprising:*

*computer-readable program code configured to cause a computer to receive an indication of a user selection;*

*computer-readable program code configured to cause a computer to determine whether information for a user-selectable region is based on a key sample alone or the key sample in combination with an override sample;*

*computer-readable program code configured to cause a computer to merge information from the key sample with information from the override sample to determine a region definition if the information for the user-selectable region is based on the key sample in combination with the override sample, and otherwise to use the information from the key sample alone to determine the region definition, the region definition defining at least one spatial location;*

*computer-readable program code configured to cause a computer to determine a spatial location of the user-selectable region at a time the user selection is made based at least in part on the region definition; and*

*computer-readable program code configured to cause a computer to output a signal indicating whether the user selection falls within the user-selectable region.*

*111. The computer program product of claim 110, further comprising computer-readable program code configured to cause a computer to determine, based on both the key sample and the override sample, an action to be taken in response to the user selection if the information for the user-selectable region is based on the key sample in combination with the override sample, and otherwise to determine, based on the key sample alone, the action to be taken in response to the user selection.*

*112. A computer program product for determining a location of a user-selectable region, the computer program product having a computer-readable storage medium having computer executable code for:*

*receiving an indication of a user selection;*

*determining whether information for a user-selectable region is based on a key sample alone or the key sample in combination with an override sample;*

*merging information from the first sample with information from the override sample to determine a region definition if the information for the user-selectable region is based on the key sample in combination with the override sample, otherwise using the information from the key sample alone to determine the region definition, the region definition defining at least one spatial location;*

*determining a spatial location of the user-selectable region at a time the user selection is made based at least in part on the region definition; and*

*outputting a signal indicating whether the user selection falls within the user-selectable region.*

*113. The computer program product of claim 112, further comprising computer executable code for:*

*comparing a location on a display of the user selection with the spatial location of the user-selectable region at the time the user selection is made; and*

*determining whether the user selection is a selection of the user-selectable region based on the comparing.*

*114. The computer program product of claim 112, further comprising computer executable code for determining, based on both the key sample and the override sample, an action to be taken in response to the user selection if the information for the user-selectable region is based on the key sample in combination with the override sample, otherwise determining, based on the key sample alone, the action to be taken in response to the user selection.*

*115. An apparatus comprising:*

*an input device, for receiving an indication of a user selection;*

*a region determination module, coupled to the input device for:*

*determining whether information for a user-selectable region is based on a key sample alone or the key sample in combination with an override sample;*

*merging information from the key sample with information from the override sample to determine a region definition if the information for the user-selectable region is based on the key sample in combination with the override sample, otherwise using the information from the key sample alone to determine the region definition, the region definition defining at least one spatial location;*

*determining a spatial location of the user-selectable region at a time the user selection is made based at least in part on the region definition; and*

*outputting a signal indicating whether the user selection falls within the user-selectable region.*

*116. The apparatus of claim 115, further comprising:*

*a comparator, coupled to the region determination module, for:*

*comparing a location on a display of the user selection with the spatial location of the user-selectable region at the time the user selection is made; and*

*determining whether the user selection is a selection of the user-selectable region based on the comparing.*

*117. The apparatus of claim 115, further comprising an action determination module, coupled to the region determination module, for determining, based on both the key sample and the override sample, an action to be taken in response to the user selection if the information for the user-selectable region is based on the key sample in combination with the override sample, otherwise determining, based on the key sample alone, the action to be taken in response to the user selection.*

*118. A method for defining a user-selectable region on a display device, comprising:*

*accessing a region definition of a user-selectable region corresponding to at least one spatial location in a first frame of a video track stored on a storage device;*

*applying a transformation matrix to the region definition, to obtain an area occupied by the region on the display device;*

*accessing a second region definition corresponding to at least one spatial location in a second frame of the video track, the first and second frames having a relationship so that combining information corresponding to the first and second frames produces a valid result;*

*applying a second transformation matrix to the second region definition, to obtain a second area occupied by the region on the display device;*

*interpolating between the first area and the second area occupied by the region, to determine an intermediate area occupied by the region on the display device; and*

*outputting a signal indicating whether a user selection falls within the intermediate area.*

*119. The method of claim 118, wherein applying a transformation matrix to the region definition comprises:*

*multiplying each point in the region definition by the transformation matrix using vector multiplication.*

*120. The method of claim 118, further comprising:*

*receiving user input indicating a pixel location; and*

*determining whether the indicated pixel location is within the area occupied by the region on the display device.*

*121. The method of claim 118, wherein the region definition is provided in a first graphical coordinate system, and wherein applying a transformation matrix to the region definition comprises transforming the region definition to a second graphical coordinate system.*

*122. An apparatus comprising:*

*a storage device including a video track comprising a plurality of frames, wherein a first frame of the video track contains at least one spatial location included in a user-selectable region definition; and*

*a processing unit coupled to the storage device which:*

*determines an area occupied by the user-selectable region applying a transformation matrix to the region definition, to obtain an area occupied by the region on the display device;*

*accesses a second region definition corresponding to at least one spatial location in a second frame of the video track, the first and second frames having a relationship so that combining information corresponding to the first and second frames produces a valid result;*

*applies a second transformation matrix to the second region definition, to obtain a second area occupied by the region on the display device; and*

*interpolates between the first area and the second area occupied by the region, to determine an intermediate area occupied by the region on the display device; and*

*outputs a signal indicating whether a user selection falls within the intermediate area.*

*123. The apparatus of claim 122, wherein the processing unit applies the transformation matrix to the region definition by multiplying each point in the region definition by the transformation matrix using vector multiplication.*

*124. The apparatus of claim 122, further comprising:*

*an input device, coupled to the processing unit, for receiving user input indicating a pixel location;*

*and wherein the processing unit determines whether the indicated pixel location is within the area occupied by the region on the display device.*

*125. The apparatus of 122, wherein the region definition is provided in a first graphical coordinate system, and wherein the processing unit applies the transformation matrix to the region definition to transform the region definition to a second graphical coordinate system.*

*126. A computer program product comprising a computer-usable medium storing computer-readable code therein for defining a user-selectable region on a display device comprising:*

*computer-readable program code configured to cause a computer to access a region definition of a user-selectable region corresponding to at least one spatial location in a first frame of a video track stored on a storage device;*

*computer-readable program code configured to cause a computer to apply a transformation matrix to the region definition, to obtain an area occupied by the region on the display device;*

*computer-readable program code configured to cause a computer to access a second region definition corresponding to at least one spatial location in a second frame of the video track, the first and second frames having a relationship so that combining information corresponding to the first and second frames produces a valid result;*

*computer-readable program code configured to cause a computer to apply a second transformation matrix to the second region definition, to obtain a second area occupied by the region on the display device;*

*computer-readable program code configured to cause a computer to interpolate between the first area and the second area occupied by the region, to determine an intermediate area occupied by the region on the display device; and*

*computer-readable program code configured to cause a computer to output a signal indicating whether a user selection falls within the intermediate area.*

*127. The computer program product of claim 126, wherein the computer-readable program code configured to cause a computer to apply a transformation matrix to the region definition comprises:*

*computer-readable program code configured to cause a computer to multiply each point in the region definition by the transformation matrix using vector multiplication.*

*128. The computer program product of claim 126, further comprising:*

*computer-readable program code configured to cause a computer to receive user input indicating a pixel location; and*

*computer-readable program code configured to cause a computer to determine whether the indicated pixel location is within the area occupied by the region on the display device.*

*129. The computer program product of 126 wherein the region definition is provided in a first graphical coordinate system, and wherein the computer-readable program code configured to cause a computer to apply a transformation matrix to the region definition comprises computer-readable program code configured to cause a computer to transform the region definition to a second graphical coordinate system.*

*130. A method comprising:*

*receiving an indication of a user selection;*

*merging information from the first sample with information from a second sample to determine a region definition, the region definition defining at least one spatial location, the first and second samples having a relationship so that combining information from the first and second samples produces a valid result; and*

*determining a spatial location of the user-selectable region at a time the user selection is made based at least in part on the region definition; and*

*outputting a signal indicating whether the user selection falls within the user-selectable region.*

*131. An apparatus comprising:*

*an input device, for receiving an indication of a user selection;*

*a region determination module, coupled to the input device, for:*

*merging information from the first sample with information from a second sample to determine a region, the including at least one spatial location, the first and second samples having a relationship so that combining information from the first and second samples produces a valid result;*

*determining a spatial location of the user-selectable region at a time the user selection is made based at least in part on the region definition; and*

*outputting a signal indicating whether the user selection falls within the user-selectable region.*

* * * * *